United States Patent [19]
Carson

[11] Patent Number: 5,978,805
[45] Date of Patent: *Nov. 2, 1999

[54] METHOD AND APPARATUS FOR SYNCHRONIZING FILES

[75] Inventor: Dwayne A. Carson, Brockton, Mass.

[73] Assignee: Microcom Systems, Inc., Norwood, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/856,111

[22] Filed: May 14, 1997

Related U.S. Application Data

[60] Provisional application No. 60/017,750, May 15, 1996.

[51] Int. Cl.⁶ .................................................. G06F 17/00
[52] U.S. Cl. ............................ 707/10; 707/202; 707/204; 707/205
[58] Field of Search ............................... 707/10, 205, 202, 707/204; 211/144; 834/4; 395/185.01, 184.01, 200.76, 286, 182.16

[56] References Cited

U.S. PATENT DOCUMENTS

| | | | |
|---|---|---|---|
| 3,311,893 | 3/1967 | Landell | 340/172.5 |
| 3,612,660 | 10/1971 | Miller | 340/172.5 |
| 4,232,375 | 11/1980 | Paugstat et al. | 364/900 |
| 4,412,306 | 10/1983 | Moll | 364/900 |
| 4,891,785 | 1/1990 | Donohoo | 364/900 |
| 4,914,583 | 4/1990 | Weisshaar et al. | 364/200 |
| 5,086,402 | 2/1992 | Sterling, II | 364/514 |
| 5,086,434 | 2/1992 | Abe et al. | 375/7 |
| 5,101,348 | 3/1992 | Arrowood et al. | 395/200 |
| 5,155,847 | 10/1992 | Kirouac et al. | 395/600 |
| 5,163,137 | 11/1992 | Yamamoto et al. | 395/286 |
| 5,210,865 | 5/1993 | Davis et al. | 395/575 |
| 5,222,224 | 6/1993 | Flynn et al. | 711/144 |
| 5,274,807 | 12/1993 | Hoshen et al. | 707/205 |
| 5,283,646 | 2/1994 | Bruder | 348/415 |
| 5,446,888 | 8/1995 | Pyne | 395/600 |
| 5,506,958 | 4/1996 | Myran | 395/182.16 |
| 5,539,879 | 7/1996 | Pearce et al. | 395/184.01 |
| 5,583,988 | 12/1996 | Crank et al. | 395/185.01 |
| 5,659,614 | 8/1997 | Bailey, III | 834/4 |
| 5,721,907 | 2/1998 | Pyne | 707/10 |
| 5,752,251 | 5/1998 | Cripps | 707/202 |

*Primary Examiner*—Wayne Amsbury
*Assistant Examiner*—Thuy Pardo
*Attorney, Agent, or Firm*—Mintz, Levin, Cohn, Ferris, Glovsky and Popeo, P.C.

[57] ABSTRACT

A method and apparatus is disclosed for synchronizing files stored in memory of two remotely located systems. The system can generate a copy of a source file at the destination location without transferring all the data of the source file. The destination location includes a reference file that can contain similar data as that contained in the source file. The synchronization is accomplished by sending keys (representing reference blocks of data from the reference file) to the source system. At the source system, a portion of each keys called a Feature is compared with portions of source file. If the Features match, a checksum corresponding to the reference block is compared with a check sum corresponding to the source block. If the checksums match, an short message identifying the key and reference block that matched is transmitted to the destination system in order that the reference block can be copied from the reference file in order to build the synchronized file.

21 Claims, 14 Drawing Sheets

METHOD AND APPARATUS FOR SYNCHRONIZING FILES

CROSS-REFERENCE TO RELATED APPLICATIONS

This application claims benefit of Provisional Application No. 60/017,750, filed May 15, 1996.

COPYRIGHT NOTICE

Copyright, 1995, 1996, Microcom Systems, Inc. A portion of the disclosure of this patent document contains material which is subject to copyright protection. The copyright owner has no objection to reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates generally to a system for transferring data between computer storage devices, and more particularly to a system for efficiently synchronizing the contents of specific files stored on two remotely located computers.

There is currently a marked growth and dependence upon mobile and remote computing systems. These systems allow users to access data files (stored at the host site) from remote locations. In many circumstances it is desirable to have a copy of the data file at the remote location for access by a remote user. This presents difficulty where the file is being updated by local users. Alternatively, where the remote user modifies the data file, it is desirable to be able to update the file at the host site.

Where the size of the file is very large, and the communication link, typically a computer modem, is relatively slow (28.8K bits per second), the time and cost to transfer the file can be excessive. This is especially true where there are very few differences between the two files. Therefore, it is desirable to be able to update the file without having to transmit the entire file.

OBJECTS OF THE INVENTION

Accordingly, it is an object of the invention to provide an improved system for duplicating the contents of a file stored on source system at a destination system.

It is another object of the invention to provide an improved system for duplicating the contents of a file stored on source a system at a destination system without transmitting the entire file from one system to another.

It is a further object of the invention to provide an improved system for duplicating the contents of a file stored on source system at a destination system without transmitting the entire file from one system to another in as fast a manner as possible.

Other objects and advantages of the present invention will become readily apparent to those skilled in this art from the following detailed description wherein a preferred embodiment is shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not restrictive.

SUMMARY OF THE INVENTION

The invention is directed to an improved system for transferring blocks of data or files between computer storage devices and for synchronizing or updating the contents of duplicate files stored at both storage devices. In accordance with the present invention, a system is disclosed for synchronizing the contents of one or more files stored in separate storage devices or storage locations. In accordance with one of the preferred embodiments of the invention, a system is disclosed which enables two remotely located computers to exchange data over a communications link in order to duplicate the contents of one or more files stored on one of the computers on the other computer. Where the destination computer contains a file similar to the file to be duplicated, this can be accomplished by transmitting less than the entire file over the communications link to the destination computer, thus enabling the file to be duplicated faster and providing for efficient use of the communications link.

In one embodiment, the system involves transferring a source file stored on a source computer to be transferred to a destination computer containing an older file or reference file. The reference file is updated, also termed synchronized, with the source file in accordance with one method of the invention.

The process includes dividing the reference file into reference blocks having a preselected length. For each reference block, a reference CRC-item is determined using the data from that reference block. In one preferred embodiment, the reference CRC-item includes a subset of data units from the block, herein referred to as a Feature, the length L of the reference block and a checksum value for the block of L data units. Preferably, the checksum uses a cyclic redundancy check (CRC) checksum algorithm. A CRC-item is created for each subsequent block.

In one embodiment, several CRC-items are created together and the Features are selected such that they are unique with respect to one or more adjacent CRC-items. If the Feature for a given block is similar or identical to the Feature of one or more previous CRC-items, the block is searched (from the beginning to a search limit) for a subset of bytes that are not substantially identical to the prior Features. Once an acceptable Feature is selected, the bytes prior to the Feature bytes in the block are added to the previous block and the length L and the CRC value in the CRC-item corresponding to the previous block are adjusted accordingly.

Each CRC-item is transmitted to the source computer, whereby at least a portion of the source file is searched for a group of data units which match the Feature. In the preferred embodiment, a portion of the source file is stored in a cache memory that permits high speed comparisons. If a match is found, a source checksum value is determined for the L data units in the source file that include the matching portion. If the source checksum value matches the reference checksum value in the CRC-item, that block in the source file is presumed to match the corresponding block in the reference file and thus does not need to be transmitted over the communications link. At this point any bytes located in the source file prior to the bytes matching the Feature bytes are transmitted to the destination computer in order to duplicate the source file at the destination computer and a match indicator specifying the matching block in the reference file is sent to the destination computer.

If the CRC value does not match the source CRC value, the Feature is compared to at least the remainder of the portion of the source file. If no match is encountered, it is assumed that the reference block corresponding to that Feature and CRC-item has been deleted from the source file.

The Feature from the next CRC-item is then compared again to the same portion of the source file as stated above. This process is repeated for all CRC-items or until the end of the source file is reached. If no match is encountered, that remaining portion of the source file is transmitted to the destination computer in order to duplicate that portion of the source file at the destination computer.

The process is then repeated by comparing subsequent reference CRC-items with subsequent portions of the source file until the source file is completely duplicated at the destination computer. In an alternative embodiment, where the source file is relatively small the entire source file can be searched.

In the preferred embodiment, the source and destination computers communicate with each other in accordance with a predefined protocol. The protocol allows multiple CRC-items to be transferred in the form of a CRC-block containing, for example, as many as 50 CRC-items. The protocol also provides that when a match between a source block in the source file matches a reference block in the reference file, the source computer transmits a protocol message to the destination computer identifying the specific block in the reference file that can be used by the destination computer in duplicating the source file. Typically, this is accomplished by identifying (a) the offset into the reference file where the reference block begins and (b) the length of the reference block.

DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

The invention is directed to a method and apparatus for transferring a file, herein referred to as the source file, from a source location to a destination location. In accordance with the invention, the destination location can include a file, herein referred to as the reference file, that contains similar data. Typically, the source file is a modified version of the reference file. In accordance with the invention, instead of transmitting the entire source file to the destination location, the reference file is divided into reference blocks and each reference block is compared to a portion of the source file to determine whether the reference block can be used to construct the source file at the destination location. Instead of sending the entire source block that matched, a relatively small message identifying the matching reference block is sent to the destination location whereby the matching reference block is used to construct an accurate copy of source file at the destination location. In this way, only copies of the source file that do not match blocks from the reference file are transmitted, thus reducing the amount of data transferred from the source location to the destination location.

In one embodiment, the user merely desires to update or synchronize a file at a first location with respect to a file located at a second location. In this situation, information about the files at each location is compared to determine which is to be designated the source file and which is to be designated the reference file. In the preferred embodiment, prior to the beginning the of the synchronization process, the time and date stamps of the files, the lengths of the files and checksums calculated for the entire length of both files are compared respectively in order to determine whether the files are identical. If the files are not identical, the file having the most recent time and date stamp is designated as the source file and the file having the oldest time and date stamp is designated as the reference file. The length of the source file can also be used by the destination process to determine when the reconstruction of the source file at the destination location is completed.

In accordance with one embodiment of the invention, the method of the invention is performed utilizing two separate processes, herein referred to as the destination process and the source process. The destination process operates on the reference file and construct a copy of the source file at the destination location using information received from the source process. The source process operates on the source file using information received from the destination process to determine which portions of the source file need to be duplicated and transferred to the destination location and which portions can be copied or used from the reference file.

Figure 1:
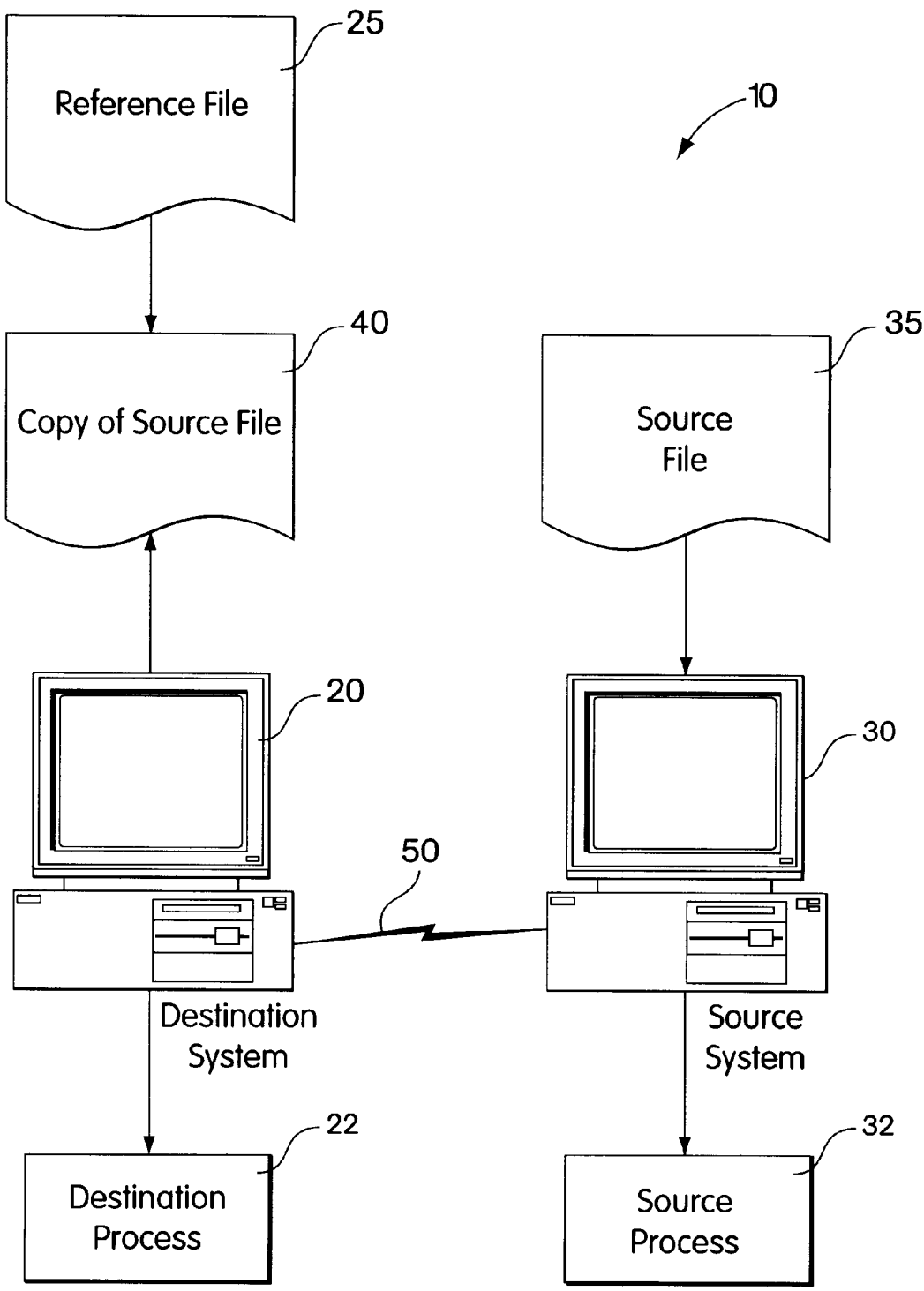
FIG. 1 is a diagrammatic view of a system in accordance with the invention.

FIG. 1 shows a system 10 in accordance with the preferred embodiment of the invention. The system 10 includes a destination system 20 and source system 30. For purposes of illustration, the destination process can be performed by the destination system 20 and the source process can be performed by the source system 30. The destination system 20 includes a reference file 25 and a destination location 40 for storing a copy of the source file, herein referred to as the reconstruction file. The source system 30 includes a source file 35. In the preferred embodiment, the destination process is embodied in software 22, stored in memory of the destination system 20 and executed by the central processing unit (CPU—not shown) of the destination system 20 and the source process is embodied in software 32, stored in memory of the source system 30 and executed by the CPU (not shown) of the source system 30. Appendix A includes source code in the C programming language which implements the file synchronization process in accordance with the invention.

A communications link 50 interconnects destination system 20 and source system 30 to enable data to be transferred bidirectionally between the destination system 20 and the source system 30. The communications link 50 can be any means by which two systems can transfer data such as a wired connection, e.g., a serial interface cable, a parallel interface cable, or a wired network connection; or a wireless connection, e.g., infrared, radio frequency or other type of signal communication techniques or a combination of both. In the preferred embodiment, the destination system 20 and the source system 30 include modems (not shown) and are interconnected via a public switched telephone network (PSTN). In addition, the communications link 50 is considered to provide an error correcting link between the destination system 20 and source system 30 and thus the source and destination processes can assume that data transmitted is received without errors.

Figure 2:
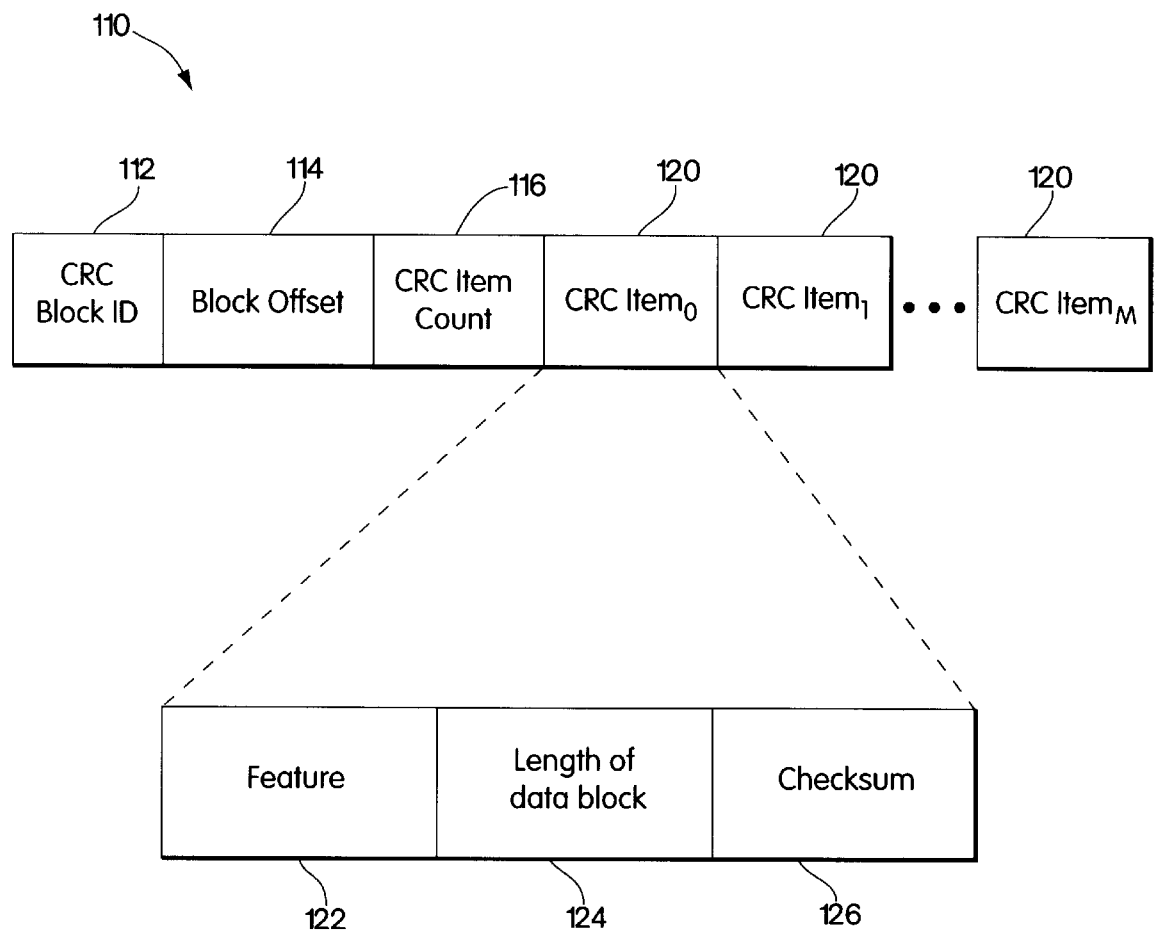
FIG. 2 is a diagram showing the structure of CRC-block in accordance with the invention.

The destination process produces CRC-blocks and transfers the CRC-blocks to the source process over the communications link 50. A CRC-block includes one or more CRC-items. The CRC-items represent a block of data in the reference file (a reference block) and are used by the source process to compare the contents of the reference block with the same size block of data from the source file (a source block). FIG. 2 shows the structure of a CRC-item 120 and a CRC-Block 110 in accordance with the preferred embodiment of the invention.

Each CRC-item 120 is composed of a Feature 122, a length value L 124 corresponding to the length of the reference block and a checksum value 126. The Feature 122 is a set of data units from the source block. The source process will search for the Feature in the source in order to determine whether the reference block matches a source block of length L 124 which includes the data units that matched the Feature 122. In the preferred embodiment, the Feature 122 contains the first 16 bytes from the reference block, the length L 124 of the reference block is 5120 bytes and the checksum value 126 is a 32 bit Cyclic Redundancy Check value although these numbers can clearly vary.

Each CRC-block 110 is composed of a CRC-block ID 112, a block offset value 114, a CRC-item count value 116 (indicating the number of CRC-items included in the CRC-block 110) and one or more CRC-items 120. The CRC-block ID 112 is a unique identifier used to identify each CRC-block 110 transferred to the source process. The block offset value 114 is an indicator of the location of the reference block in the reference file corresponding to the first CRC-item in the CRC-block 110. Preferably, the block offset value 114 is expressed in terms of the number of bytes offset from the beginning of reference file. The destination process also generates an ENDCRC message (not shown) which is sent to source process to indicate that the entire reference file has been processed and no further CRC-Blocks will be transferred. Alternatively, the ENDCRC message can be a CRC-block 110 which indicates the number of CRC-items as zero.

In the preferred embodiment, the number of CRC-items 120 in the first CRC-block 110 is selected to be a smaller number than subsequent CRC-blocks. This speeds up the overall process by allowing the source process to begin processing CRC-items 120 to determine whether any of the corresponding reference blocks match the reference file while the destination process is generating further CRC-blocks 110. Preferably, the first CRC-block 110 includes 10 CRC-items 120 and all subsequent CRC-blocks 110 include 50 CRC-items 120 although thus number can clearly vary.

Figure 3:
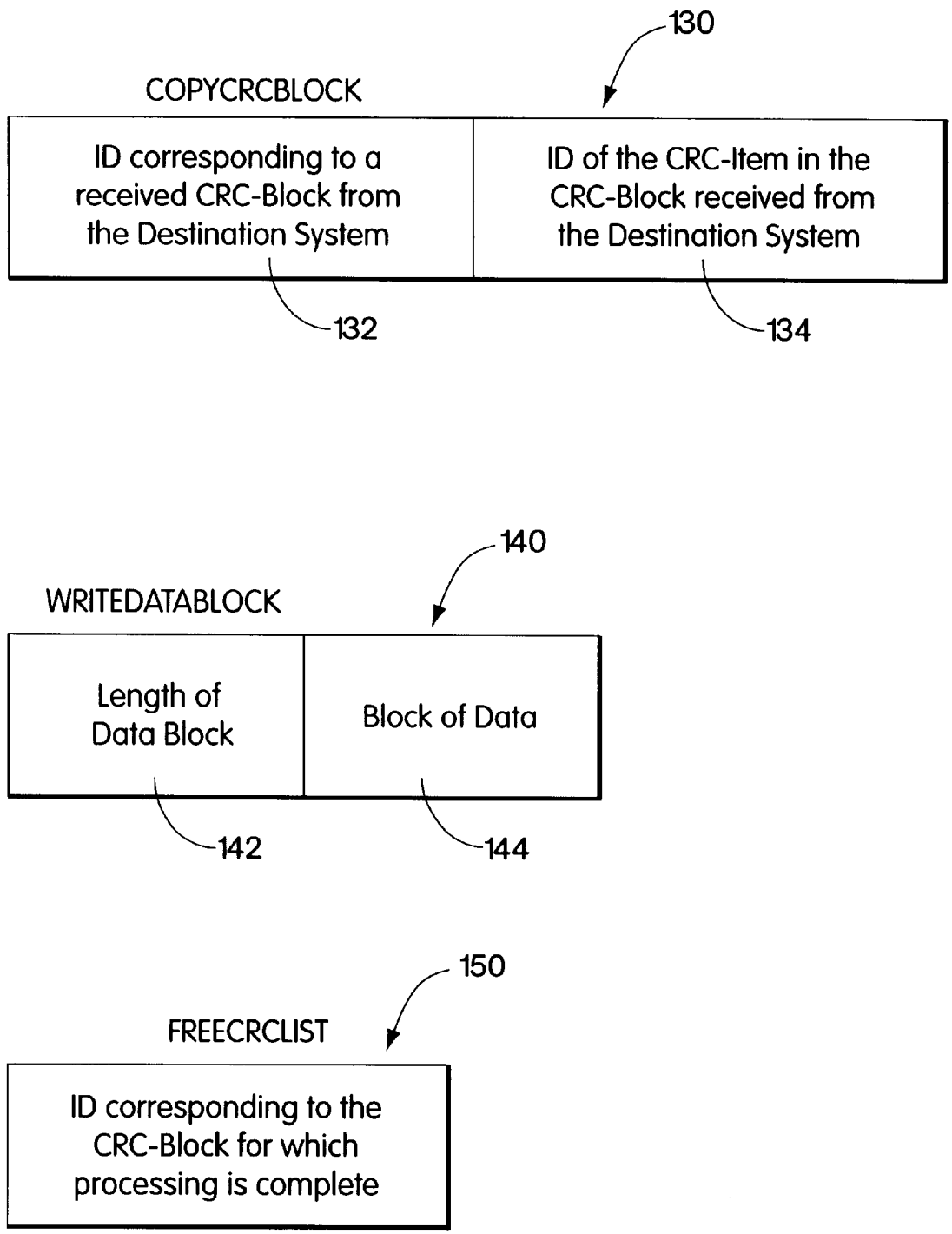
FIG. 3 is a diagram showing the structure of a Copy-CRCBlock message, a WriteDataBlock message and a FreeCRCList message in accordance with the invention.

The source process compares reference blocks to source blocks and sends either an indication that the blocks matched or a message containing a block of data that did not match any of the reference blocks. FIG. 3 shows the messages transferred from the source process to the destination process. These messages include the CopyCRCBlock message 130, the WriteDataBlock message 140 and the Free-CRCList message 150.

The CopyCRCBlock message 130 is transferred from the source process to the destination process to indicate that a reference block matched a source block. The Copy-CRCBlock message 130 includes a CRC-block identifier 132 and a CRC-item identifier 134 which identify the CRC-block 110 and CRC-item 120, respectively, that correspond to the matching reference block. The destination process will use this information to determine which reference block to copy into the file being built at the destination location.

The WriteDataBlock message 140 is transferred from the source process to the destination process to indicate that a portion of the source file was not found in the reference file. The WriteDataBlock message 140 includes a length value W 142 and a block of W data units 144. The destination process will use the block of data to build the reconstruction file at the destination location.

The FreeCRCList message 150 is transferred from the source process to the destination process to indicate that it has finished processing a particular CRC-block 110 and that the block of memory where the CRC-block 110 is stored at the destination location can be reused. The destination process maintains a copy in memory of each CRC-block 110 transferred to the source process. The destination process uses the copy of a particular CRC-block 110 along with the information provided by a CopyCRCBlock message 130 to determine which reference block is to be used to build the copy of the source file at the destination location.

Figure 4:
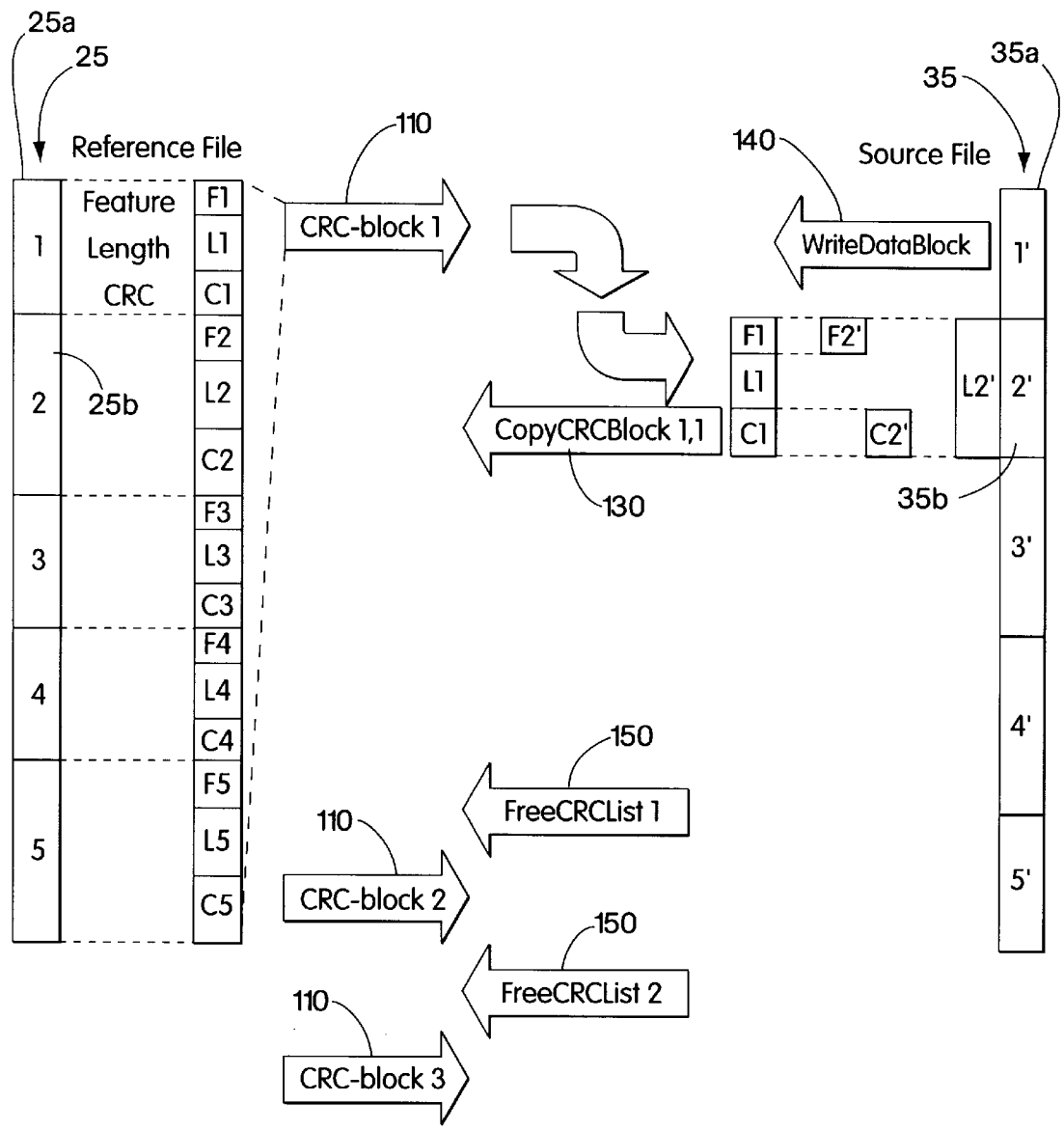
FIG. 4 is a diagram showing how messages are transferred between the destination system and the source system in accordance with the invention.

FIG. 4 shows how the messages are transferred between the destination process and the source process. The destination process transmits one or more CRC-blocks 110 to the source process. The source process uses each CRC-item 120 to compare blocks of the reference file 25 with blocks of the source file 35. If a block 35a of the source file does not match one or more of the blocks for the reference file represented in a CRC-item 110, a WriteDataBlock message 140 containing the data from the source file (block 35a) that was not found in the reference file can be sent to the destination process for use in building the reconstruction file at the destination location. Typically, this occurs after at least one block from the reference file matches a later block in the source file. In the preferred embodiment, the reconstruction file is created by sequentially appending blocks of data received from either the source file or the reference file in a predefined sequence starting at the beginning of the reconstruction file.

If a block 35b of the source file matches a block 25a of the reference file, a CopyCRCBlock 130 message is sent to the destination process indicating that a portion of the reference file can be used to reconstruct the source file at the destination location. After all the CRC-items 120 of a CRC-block 110 have been compared to the source file, the source process sends a FreeCRCList 150 to the destination process indicating that the entire CRC-block 100 has been considered and the destination process can reuse the memory (the cache block where the old CRC-block is stored) to generate and store a new CRC-block 110.

Figure 5:
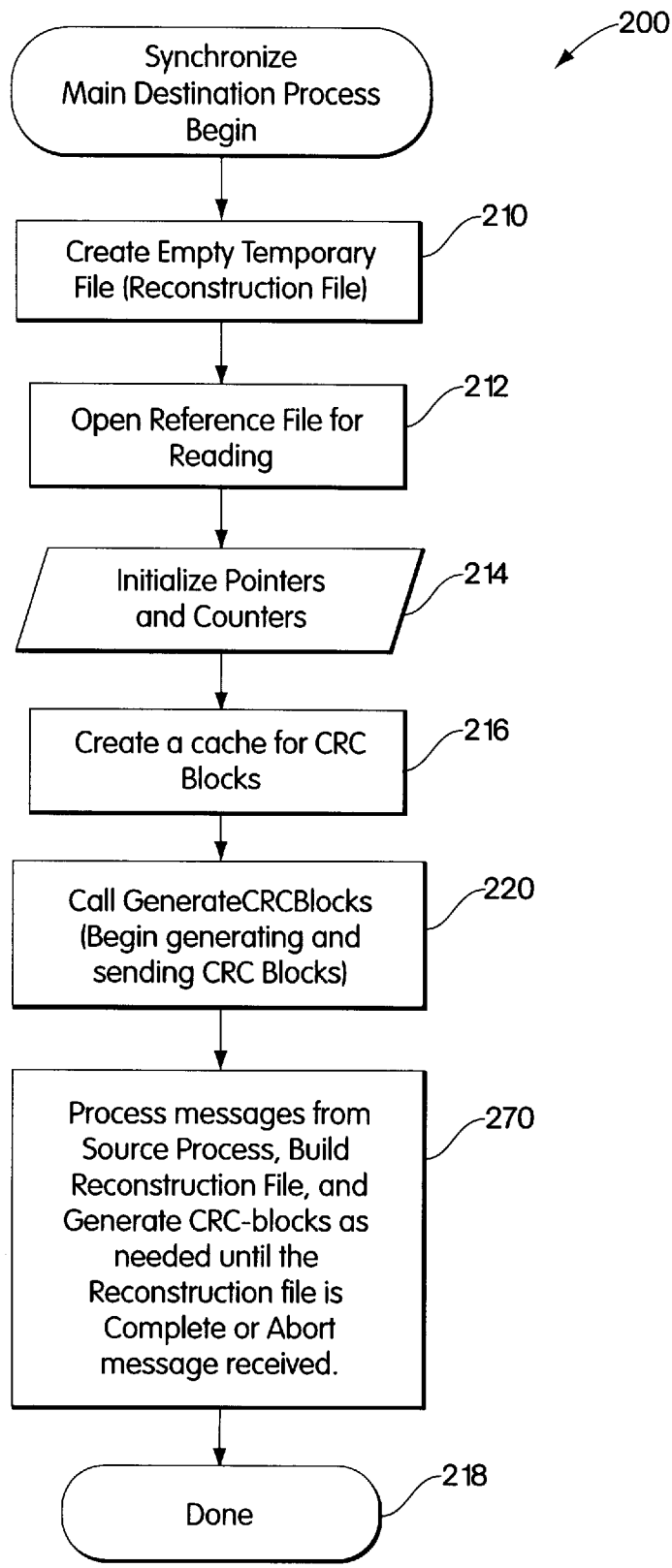
FIGS. 5–8 are flowcharts showing the destination process in accordance with the invention.
Figure 6:
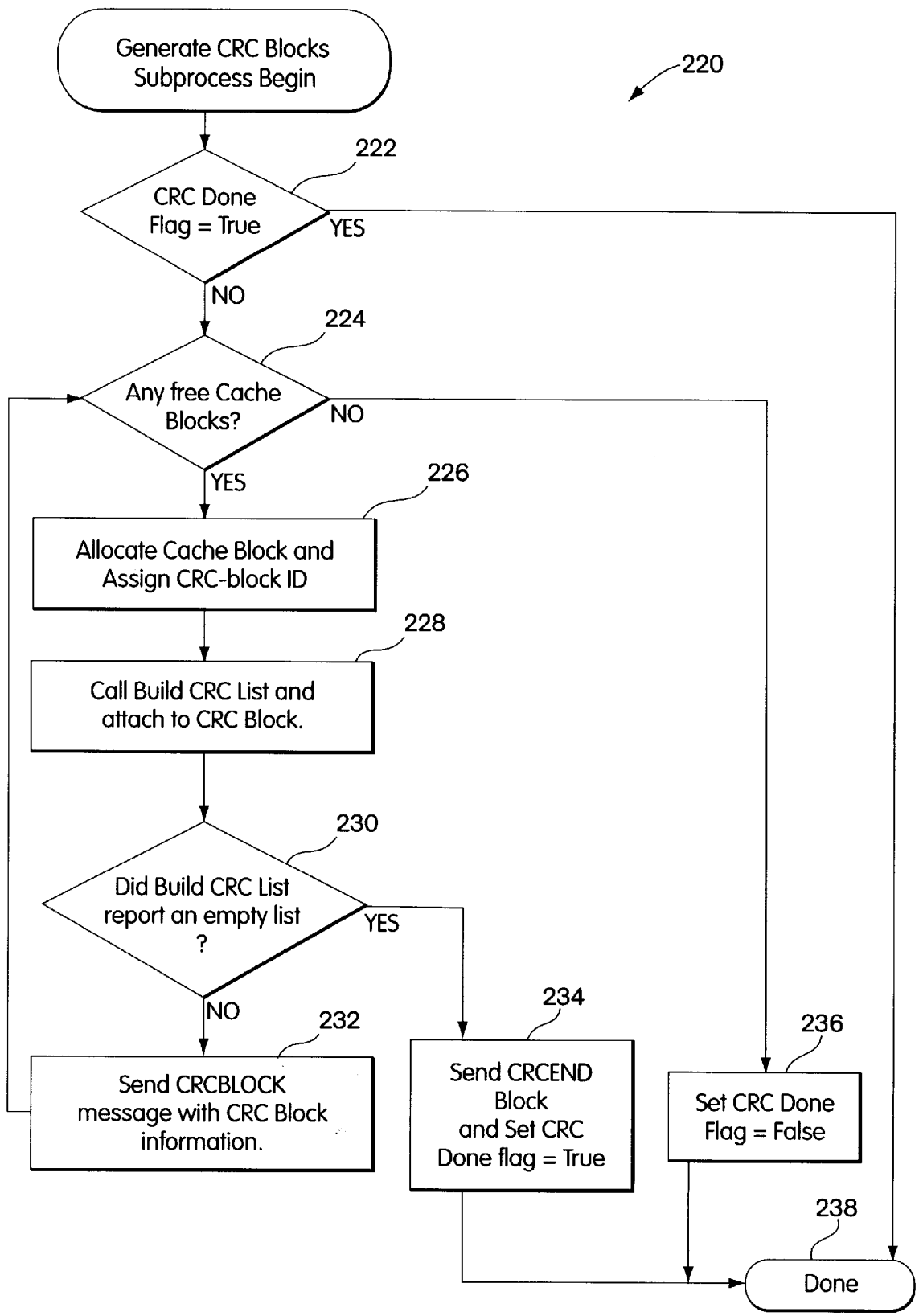
Figure 7:
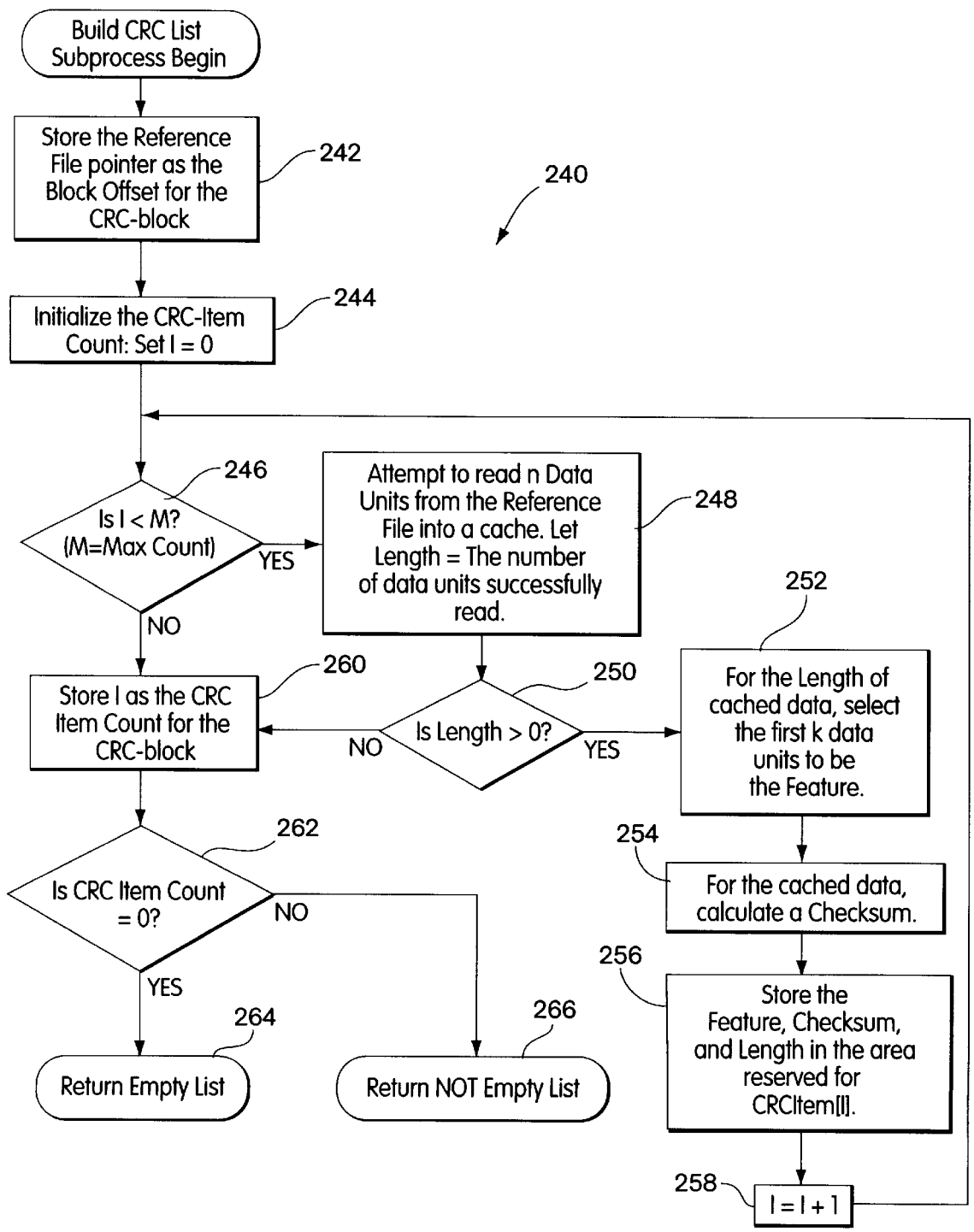
Figure 8:
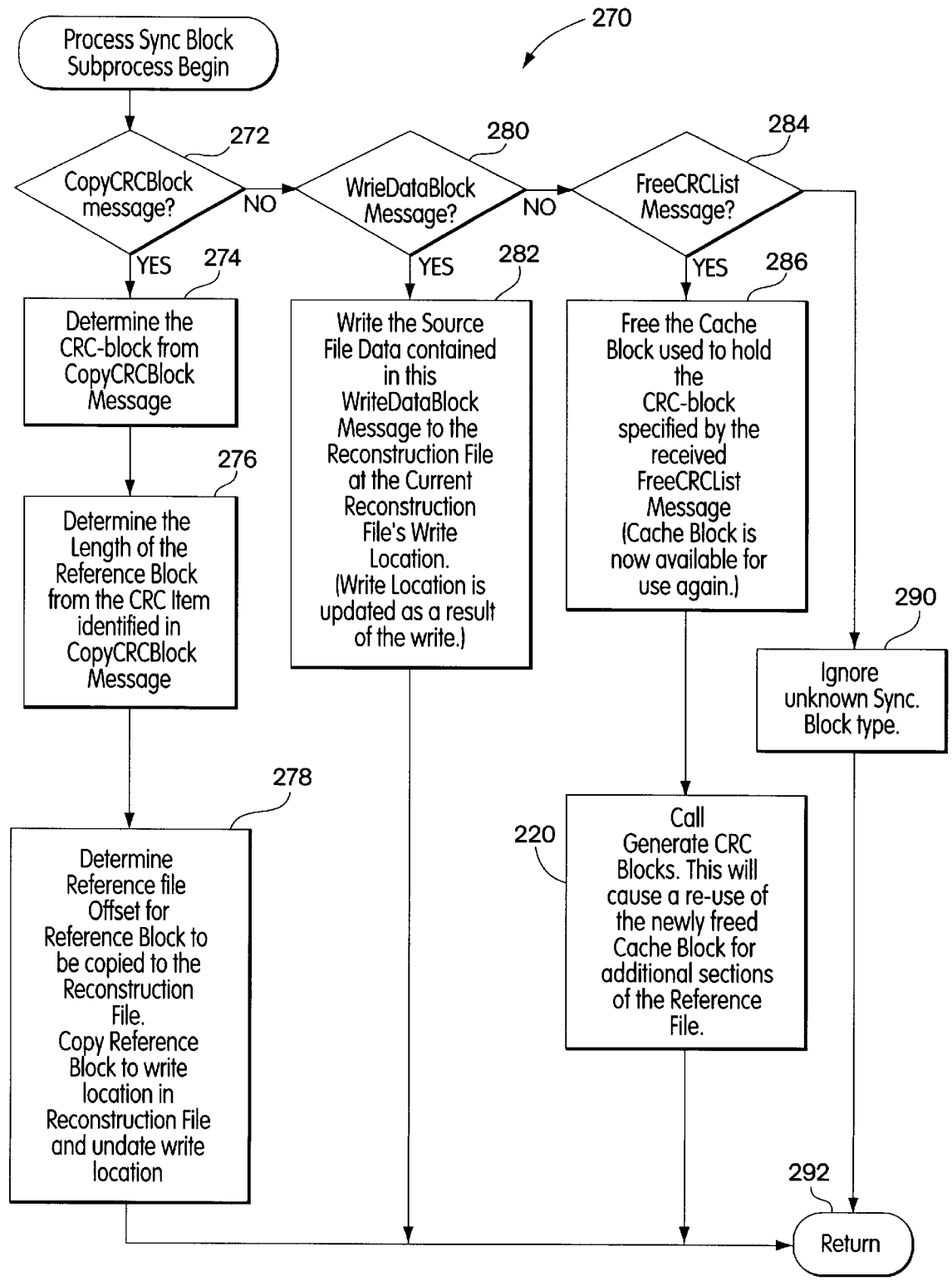

FIGS. 5–8 are flowcharts that illustrate the destination process 200. The Destination process 200 comprises three separate subprocesses, one to generate CRC-items 240 is shown in FIG. 7, one to generate CRC-blocks 220 is shown in FIG. 6 and transfer them to the source process and one to process messages received from the source process 270 is shown in FIG. 8.

FIG. 5 shows the main destination process 200 in accordance with the preferred embodiment of the invention. The destination process 200 begins by creating an empty temporary file at step 210 and opening the reference file for reading at step 212. The destination process will build the reconstruction file in the temporary file in memory from matching portions of the reference file (a reference block) and non-matching portions of the source file (transferred in WriteDataBlock messages). At step 214, the process initializes the pointers and counters (variables used during processing). The pointers keep track of the process' place in the reference file and the reconstruction file. The counters keep track of the number of CRC-blocks and CRC-items, for example.

At step 216, the destination process allocates one or more blocks of memory for building and storing CRC-blocks, herein referred to as cache blocks. In the preferred embodiment, five cache blocks are allocated and each cache block can hold one CRC-block although these numbers can vary. The destination process can use the cached blocks of CRC-items to determine the blocks of data that correspond to a matching CRC-item in order to copy these blocks into predefined positions in the reconstruction file. At step 220, the destination process begins generating and sending CRC-blocks to the source process. After the destination process has generated and sent the first group of CRC-blocks, the process continues at step 270, where messages from the source system are processed, the reconstruction file is built from WriteDataBlock and CopyCRCBlock messages and new CRC-blocks are generated as the old CRC-blocks are discarded. The process is completed when all the CRC-blocks 110 have been processed and the length of the reconstruction file is equal to the length of the source file.

FIG. 6 shows the subprocess that generates CRC-blocks 220. This subprocess uses a flag (CRC Done) to determine if the entire reference file has been processed and thus no more CRC-blocks can be generated. The flag is initially set to false and when the end of the reference file is reached the flag is set to true. The subprocess shown in FIG. 6 is performed as part of the main destination process 200 and as part of the process sync block subprocess 270 which processes synchronization messages from the source process.

The generate CRC blocks 220 subprocess begins at step 222 by testing to determine if the CRC Done flag is set to true. If the CRC Done flag is set to true there are no CRC-blocks to generate and the subprocess terminates at 238. If the CRC Done flag is set to false, the subprocess continues at step 224 where the destination system tests to determine if there are any free cache blocks to store CRC-blocks. If there are no free cache blocks the subprocess terminates at 238. If there are free cache blocks, a cache block is allocated to a new CRC-block, a new CRC-block ID is assigned and the CRC-block ID counter is incremented. The subprocess continues at step 228 where the Build CRC List subprocess is called. The Build CRC List subprocess 240 will produce a list of CRC-items that can be attached to the CRC-block ID to create a CRC-block.

At step 230, the subprocess determines whether the Build CRC List subprocess 240 returned an empty list which indicates that the destination process has reached the end of the reference file and no further CRC-items 110 can be generated. If the Build CRC List subprocess 240 returned an empty list, the subprocess continues to step 234 where the CRC Done flag is set to true and destination process sends a CRCEND block to the source process to indicate that the end of the reference file has been reached and no further CRC-blocks will be sent. If the Build CRC List subprocess 240 did not return an empty list, the subprocess continues to step 232 where the CRC-block message is sent to the source process and the process continues at step 224. At step 224, if there are any free cache blocks, the subprocess will continue to try to generate more CRC-blocks, otherwise the subprocess will terminate at step 238.

FIG. 7 shows the Build CRC List subprocess 240 which generates a list or array of the CRC-items 120. The list generated includes the Block Offset 114 and the CRC-item Count 116 that make up the CRC-block 110. The destination process maintains a reference file pointer indicating the position in the reference file where the next reference block begins. In the preferred embodiment, the reference file pointer indicates the number of bytes from the beginning of the reference file to the beginning of the reference block. The Build CRC List subprocess 240 begins at step 242 by storing the reference file pointer in the cache block as the Block Offset 114. At step 244, the CRC-item count I is initialized to zero and the process continues at step 246 where the CRC-item count is compared with the maximum number of CRC-items, M in a CRC-block. In the preferred embodiment, the first CRC-block 110 contains 10 CRC-items and each subsequent CRC-block 110 includes 50 CRC-items 120. This is accomplished by assigning M the value 10 if the reference file pointer is zero and assigning M the value 50 if the reference file pointer is greater than zero.

If the CRC-item count is less than M, the subprocess continues at step 248 by attempting to read n bytes from the reference file, where n is the nominal block size for a reference block. In the preferred embodiment, n is 5120 bytes although this number can vary. If no bytes are read, the end of the reference file has been reached and the process continues at step 260 where the CRC-item count I is stored in the CRC-item count in the cache block. If subprocess continues to step 262 to determine whether the CRC-item count is zero. If the CRC-item count is zero, the Build CRC List subprocess returns an empty list to the Generate CRC Block subprocess at step 264. If at least one CRC-item was generated, the non-empty list containing all the CRC-items generated, the Block Offset and CRC-item count are all returned to the Generate CRC Blocks subprocess at step 266.

If the number of the bytes read from the reference file is greater than zero, the subprocess continues at step 252 where the first k bytes are selected to be the Feature of the CRC-item. In the preferred embodiment, the length of the Feature k is 16 bytes although this number can vary. The subprocess continues at step 254 where a checksum is calculated for the reference block. At step 256, the Feature, the length of the reference block and the checksum are stored as a CRC-item in the cache block as part of the current CRC-block. In the preferred embodiment, the length of the reference block is stored as a four byte value and check sum is a four byte checksum although these numbers can vary. The subprocess continues to step 258 where the CRC-item count is incremented and subprocess returns to step 246 to attempt to create and add another CRC-item to the list.

FIG. 8 shows the Process Sync Block subprocess 270 which is initiated when the destination system receives a message from the source system. When a message is received, the Process Sync Block subprocess 270 determines, based upon the format of the block, whether the message is a CopyCRCBlock, step 272, a WriteDataBlock, step 280, a FreeCRCList, step 284 or an unknown message, step 290. In the preferred embodiment, each of the messages includes a header, comprising one or more data units, that indicates the type of message although this number can vary.

If the message is a CopyCRCBlock message, the subprocess continues to step 274 where the CRC-block identified in the CopyCRCBlock message is located. Once the CRC-block is located, the length of the reference block is determined from the CRC-item identified in the CopyCRCBlock message at step 276. At step 278, the offset into the reference file is determined as a function of the block offset 114 of the CRC-block 120 and the sum of all the lengths L in CRC-items from CRC-item (0) to CRC-item (p-1), where p is the identifier of the matching CRC-item 134 in the Copy-CRCBlock message 130. In the preferred embodiment, the reference file offset is the sum the block offset 114 plus the sum of the CRC-item lengths L from CRC-item (0) to CRC-item (p-1). The matching reference block is copied from the reference file to the current write location in the reconstruction file and the pointer indicating the write location is updated. The subprocess returns to waiting for a message at step 292.

If the message is a WriteDataBlock message, the subprocess continues at step 282 where the block of data 144 contained in the WriteDataBlock message is added to the reconstruction file at the current write location and pointer indicating the write location is updated. The subprocess returns to waiting for a message at step 292.

If the message is a FreeCRCList message, the subprocess continues at step 286 where a cache block is made available by discarding the CRC-block designated in the FreeCRCList message. The subprocess continues by calling the Generate CRC Block subprocess 220 where a new CRC-block is generated to fill the available cache block. The subprocess returns to waiting for a message at step 292.

If the message is an unknown message, the message is discarded and the process returns to waiting for a message at step 292.

FIGS. 9–12 are flowcharts that illustrate the source process 300. The source process 300 comprises three separate subprocesses, one to process CRC-blocks 320 and to send CopyCRCBlock messages to the destination process, one to locate CRC-items 340 in the source file and one process to send WriteDataBlock messages 370 to the destination process.

Figure 9:
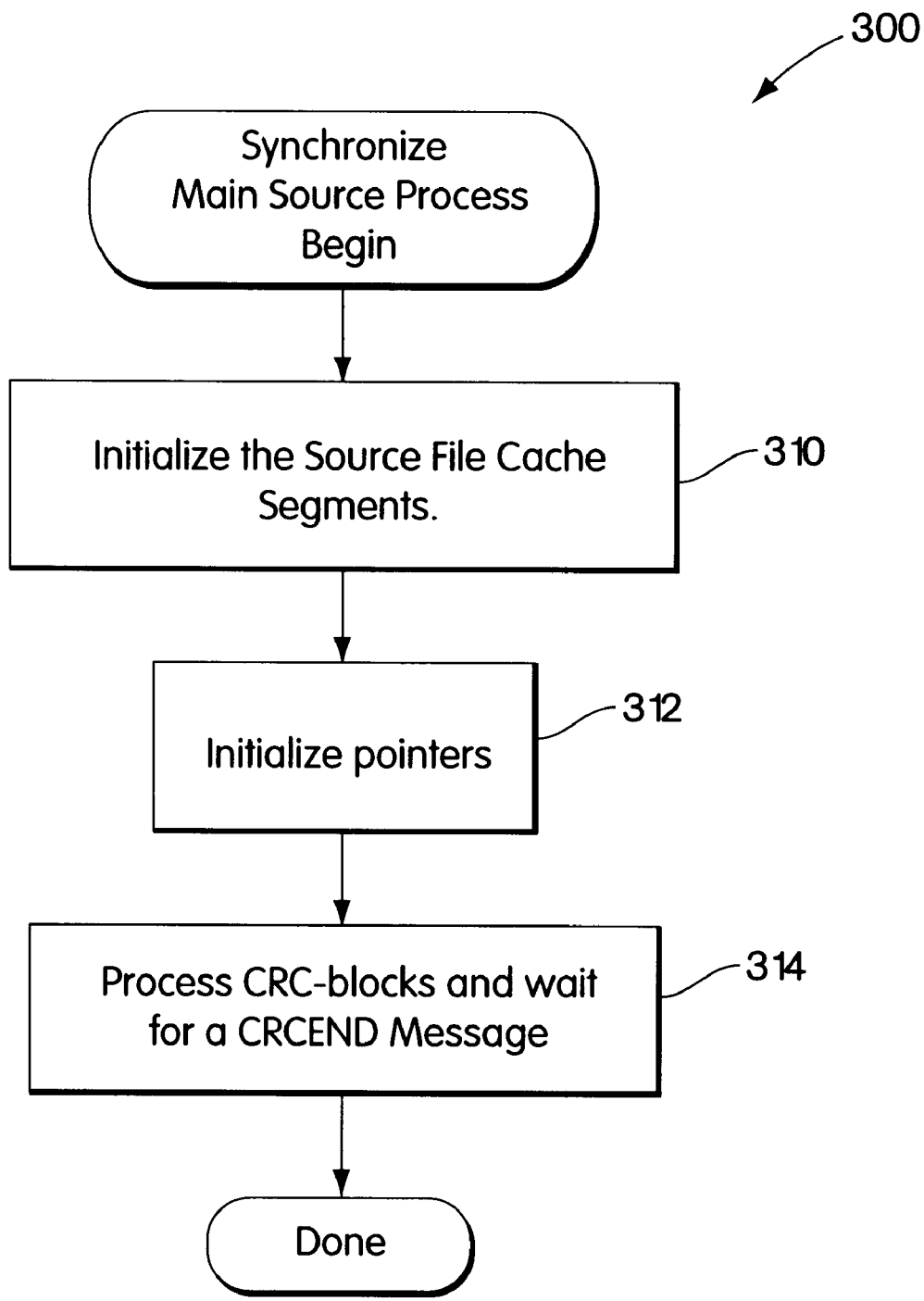
FIGS. 9–12 are flowcharts showing the source process in accordance with the invention.

FIG. 9 shows the main source process 300 in accordance with the preferred embodiment of the invention. The source process 300 begins at step 310 by initializing one or more source file cache segments and storing one or more consecutive portions of the source file in the one or more cache segments. At step 312, source file offset pointer indicating the end of the portion of the source file stored in the source file cache is set and the synchronization offset pointer and search offset pointer are initialized to the beginning of the source cache. Synchronization offset pointer (sync. offset) indicates the portion of the source file that has been recreated in the reconstruction file (through the use of CopyCRCBlock messages and WriteDataBlock messages) by indicating the location from the beginning of the source file up to where the source file and the reconstruction file match. The sync. offset pointer marks the beginning of the block of data that will be transferred to the destination system via the next WriteDataBlock message or copied from the reference file as the result of a CopyCRCBlock message. The search offset pointer is used to determine the end of the block of data to be transferred to the destination system via a WriteDataBlock message.

At step 314, the source process 300 receives CRC-blocks 110 from the destination system and waits for a CRCEND message. The source process handles each CRC-block in the order it was received. For each CRC-block received, the process CRC-block subprocess 320 processes the CRC-block to determine whether one of the reference blocks represented by one of the CRC-items matches a source block in the source file. After the source system has processed all the remaining CRC-blocks and the CRCEND is received, the source process is complete.

Figure 10:
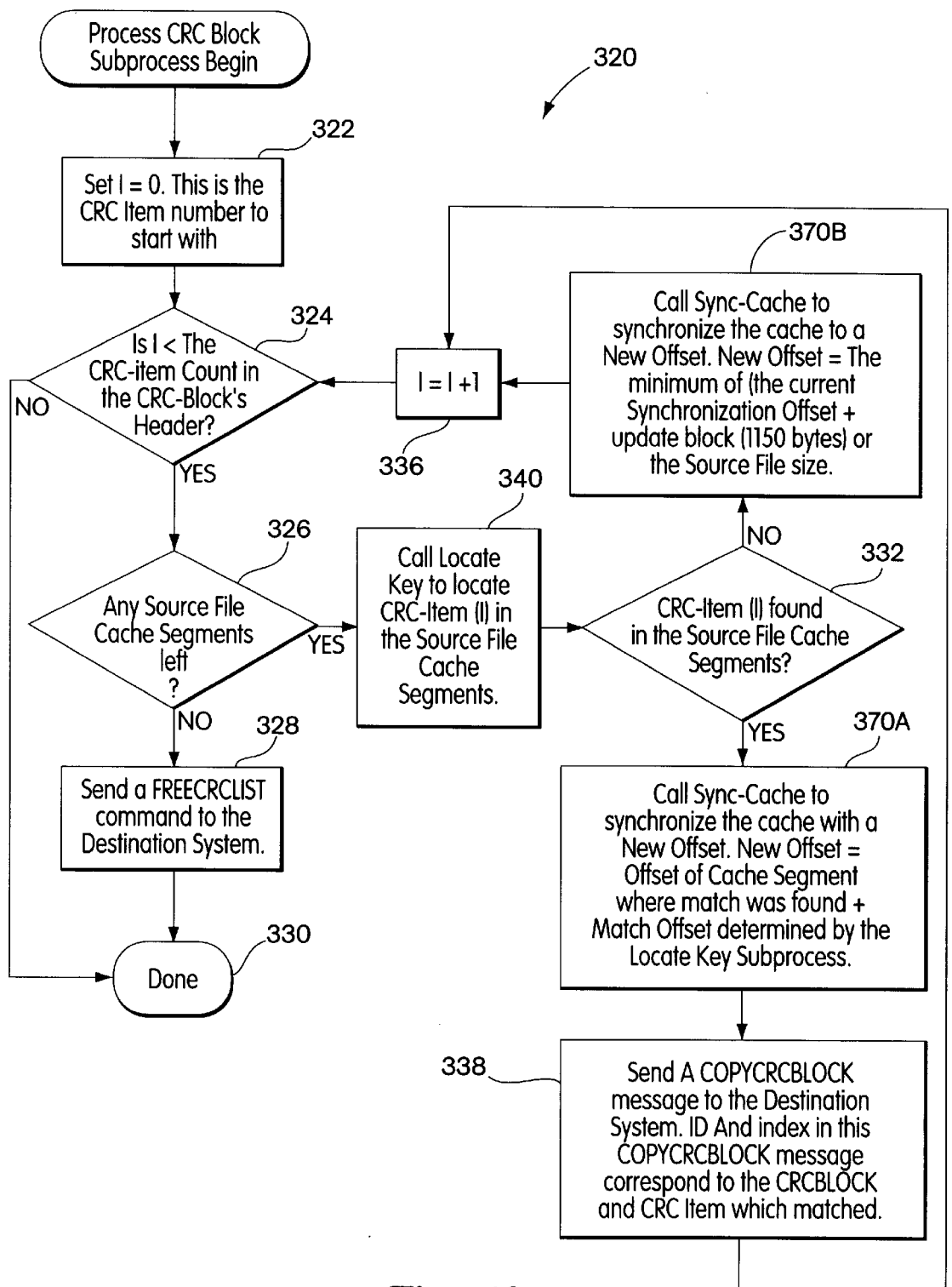

FIG. 10 shows the process CRC block subprocess 320. The process CRC block subprocess 320 utilizes the locate key subprocess 340 to find matching reference blocks in the source file and the sync-cache subprocess 370 to transfer portions of the source file that do not match the reference file to the destination system.

The process CRC block subprocess 320 begins at step 322 by initializing the CRC-item counter I. At step 324, the CRC-item counter is compared with the CRC-item count 116 from the CRC-block 110. If the CRC-item counter is greater than the CRC-item count, the process CRC-block subprocess is terminated at step 330. If the CRC-item counter is less than or equal to the CRC-item count 116, the subprocess continues to step 326 to determine if there are any cached source file segments to be compared with reference blocks. If all the cached file segments have been considered, the subprocess continues to step 328 where a FreeCRCList message is sent to the destination system and the process CRC block subprocess is terminated at step 330.

If there are cache segments to be considered, the subprocess continues to step 340 where the locate key subprocess 340 is called to search each cache segment to determine if the reference block represented by a particular CRC-item matches a block of data units in the source file. The locate key subprocess 340 returns either that a match was found, indicating the cache segment and offset location where the match was found or that a match was not found. The process CRC-block subprocess continues at step 332 to determine if a match was found. If a match was found, the subprocess continues to step 370A and if the a match is not found, the subprocess continues to step 370B.

If a match was found at step 332, the subprocess continues to step 370A where the sync-cache subprocess 370 is called to synchronize or update the reconstruction file with the source file by transferring the portion of the source file located before the offset location where the match was found to the destination system. After the reconstruction file has been synchronized with the source file up to the location where the match was found, the subprocess continues at step 338 where a CopyCRCBlock, identifying the matching CRC-item and corresponding CRC-block, is sent to the destination system to update the reconstruction file from the reference file. The sync. offset pointer is also updated at this point. The subprocess continues to step 336 where the CRC-item counter is incremented and the subprocess returns to step 324 where the subprocess is repeated for each of the CRC-items in the CRC-block or until the end of the source file is reached.

If a match was not found at step 332, the subprocess continues to step 370B where the sync-cache subprocess 370 is called to synchronize the reconstruction file with the source file by sending an update block of data to the destination system. In the preferred embodiment, update block is 1150 bytes which is intended to approximate the number of data units that could have been transmitted to the destination system in the time used to search the source file cache for the reference block using the Feature and CRC checksum (if the sync. offset pointer is less than the length of the update block from the end of the of the source file, the synchronization offset pointer is set to the end of the source file), although this number can vary. After the sync-cache subprocess 370 is completed, the process CRC block subprocess continues to step 336 where the CRC-item counter is incremented and the subprocess continues to step 324 where process CRC-block subprocess is repeated for all the CRC-items in the CRC-block.

Figure 11:
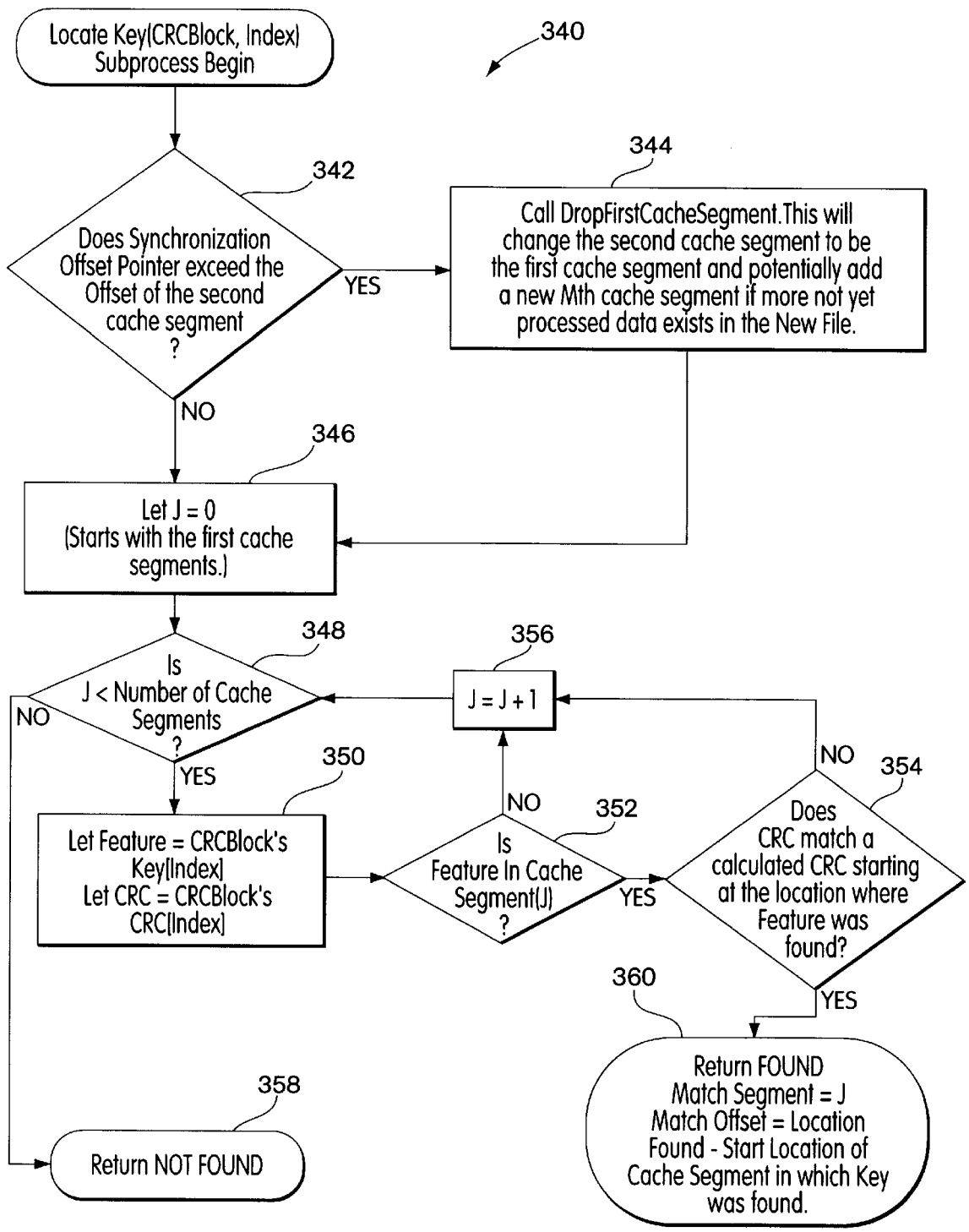

FIG. 11 shows the locate key subprocess 340. When the locate key subprocess is called, it is passed a CRC-block and an index I indicating a particular CRC-item in the CRC-block which represents a reference block to be compared with one or more cached segments of the source file. The locate key subprocess 340 will return to the calling process either that a match was found or a match was not found. If a match was found, the locate key subprocess will indicate the cache segment and the match offset location in the cache segment where the matching block begins.

The locate key subprocess 340 begins at step 342 where the subprocess tests to see if the source file data represented in the first cache segment has been sent or otherwise added to the reconstruction file. This can be accomplished by comparing the sync. offset pointer with pointer for the second cache segment. If the portion of the source file represented in first cache segment has been added to the reconstruction file, the subprocess continues to step 344 where the first cache segment is dropped and each of the cache segments advances in rank and the process continues to step 346. If the portion of the source file represented in first cache segment has not been added to the reconstruction file, the process continues to step 346.

At step 346, the subprocess 340, initializes the cache segment counter, J which references the source file cache segments. In the preferred embodiment, there are six cache segments and each cache segment is 32768 bytes in length, although these numbers can clearly vary. The subprocess continues at step 348 where the cache segment counter is tested to determine if the cache segment counter is less than the number of cache segments. If the cache segment counter is greater than the number of cache segments, the subprocess continues to step 358 where it returns an indication that a match between a specified reference block represented by a CRC-item was not found.

If the cache segment counter is less than the number of cache segments at step 348, the subprocess continues at step 350 where the Feature and CRC Checksum from the indexed CRC-item of the CRC-block are determined. The subprocess continues to step 352 where each cache segment is searched to find a portion of the source file in the source cache that matches the Feature. If a match is found, the subprocess continues to step 354 where a CRC Checksum is determined for a block of L data units beginning at the location where the Feature matched and this source block CRC checksum is compared with the reference file CRC Checksum from the CRC-item. If the source block CRC checksum and the reference block CRC checksum match, it indicates the corresponding blocks from the source and reference file are identical and it is not necessary to transmit the source block to the destination system. If the checksums match, the subprocess continues to step 360 where the control is returned to the calling process, indicating a match and position in the source cache the matching block is located.

If the Feature in step 352 or the checksums in step 354 do not match, the subprocess continues at step 356 where the cache segment counter incremented and the subprocess continues to step 348 where the subprocess is repeated for each cache segment.

Figure 12:
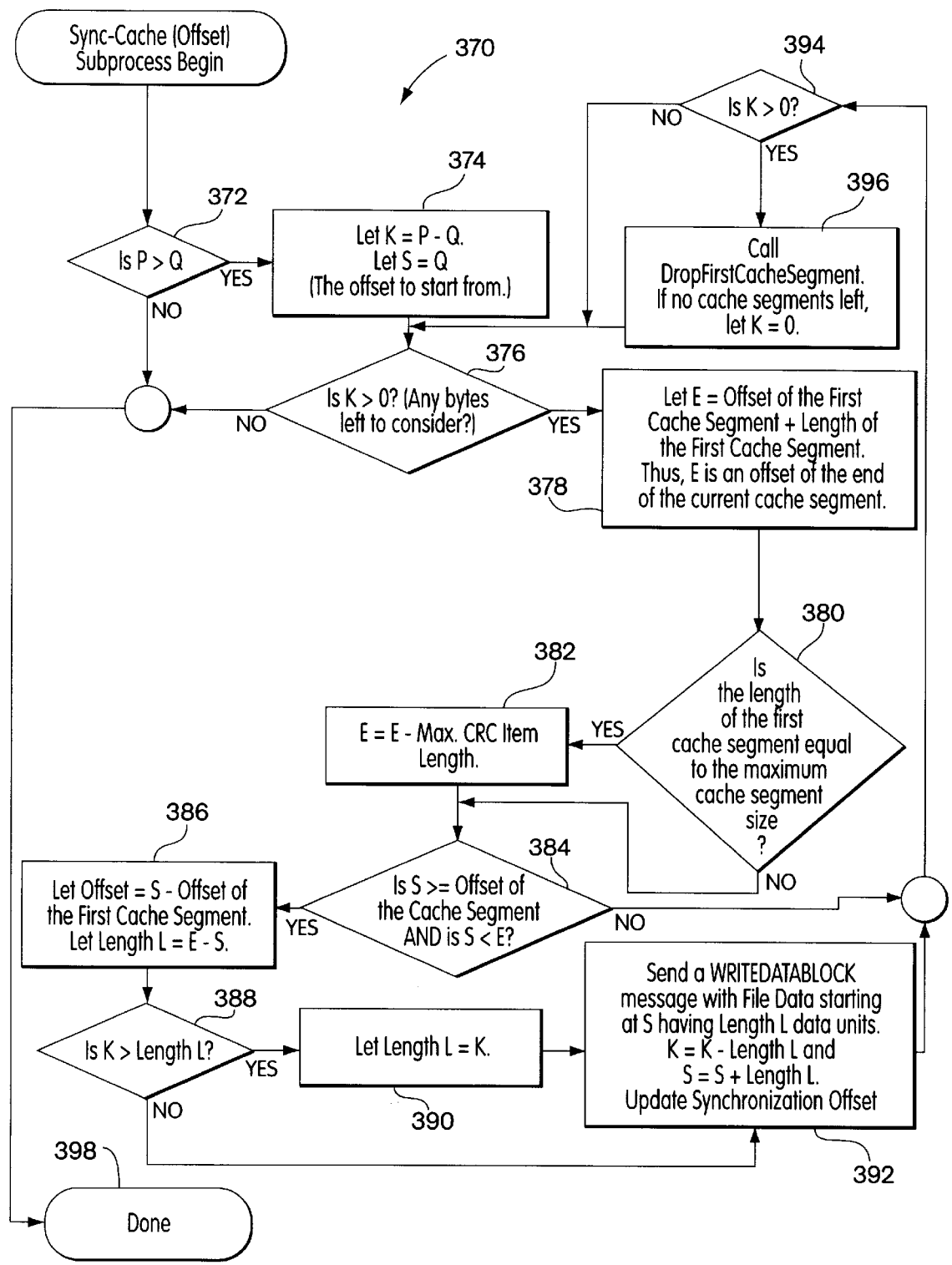

FIG. 12 shows the sync-cache subprocess 370. For each source cache segment, the source process maintains a cache pointer which references the cache segment to the source file by indicating the offset from the beginning of the source file that corresponds to the beginning of the cache segment. In addition, the source process also maintains a reconstruction file pointer which indicates the point (in the source file) up to which the source file has been reconstructed at the destination system in the reconstruction file, either using CopyCRCBlock messages or WriteDataBlock messages and a cache reconstruction pointer indicating the same location for the source file cache segments. The sync-cache subprocess 370 is used to update the reconstruction file by sending a WriteDataBlock message is to the destination system and to as to update the reconstruction file pointer. The calling process specifies a position in the source file that the reconstruction file is to be updated by passing a new Offset (or new pointer) parameter to the sync-cache subprocess 370.

The sync-cache subprocess 370 begins at step 372 where the subprocess tests to determine if the new Offset (new pointer location P) is greater than reconstruction file pointer location Q. If it is not, the sync-cache subprocess continues to step 398 where it is terminated because there are no data units to be transferred. If the new Offset is greater than the reconstruction file pointer location, the subprocess continues to step 374 and determines the total length K of the block of data to be transferred which is the difference between the new Offset location P and the current reconstruction pointer location Q. The subprocess also creates a pointer S which designates the beginning of the block of data to be sent to the destination system. The subprocess continues to step 376 where the length K is evaluated. If the length K is zero, the sync-cache subprocess continues to step 398 where it is terminated because there are no data units to be transferred. If the length K is greater than zero, the subprocess continues to step 378 where the end pointer E, the end of the first cache segment is determined. In steps 380 and 382, the location of the end pointer E is adjusted to compensate for the fact that, in the preferred embodiment, the last n data units of each source file cache segment are repeated at the beginning of the next sequential source file cache segment. This structure is used because the source system only searches each source file cache segment up to the last n bytes (where n is the length of the source block) in order to be able to generate a checksum for the next n bytes in the source block. Thus, if the block of data spans two cache segments, the first K-t bytes (where t is the number of bytes that fall in the second segment) will be sent to the destination system from the first cache segment and the remaining t bytes will be sent to the destination system from the second cache segment.

In step 380, the length of the first cache segment is tested. If the length of the first cache segment is equal to the maximum size of a cache segment, the subprocess continues at step 382 where the end pointer E is adjusted by subtracting the maximum length value of a CRC-item (the length L of a reference block) and continues to step 384. If the length of the first cache segment is not equal to the maximum size of a cache segment, the subprocess continues at step 384.

At step 384, the start pointer S is tested to determine whether it is greater than or equal to the beginning of the first cache segment and less than the location of the end pointer E. If the start pointer S is greater than or equal to the beginning of the first cache segment and less than the location of the end pointer E, the subprocess continues to step 386, otherwise the process continues to step 394. At step 386, the Offset is set to the difference between the start pointer S and the reconstruction pointer Q and the length R of the block of data to be sent from the first cache segment is set to the difference between the start pointer S and the end pointer E. The subprocess continues at step 388 where the length K is compared to the length R. If the length K is less than the length R, the subprocess continues at step 390 and if the length K is greater than or equal to the length R, the subprocess continues at step 392. At step 390, the length R is adjusted to be equal to length K and the subprocess continues at step 392.

At step 392, a WriteDataBlock message is created and sent to the destination system. The WriteDataBlock message includes length R bytes of data located in the cache segment beginning at the location of the start pointer S. In addition, the total length K is reduced by length R to account for the R bytes just transmitted to the destination system. The start pointer S is adjusted to reflect the new offset in cache segment and reconstruction file pointer is also adjusted by length R to account for the bytes transmitted to the destination system. The subprocess continues to step 394 where the value of total length K is tested. If total length K is greater than zero, there are bytes in one of the cache segments that need to sent to the destination system. The subprocess continues at step 396 where the first cache segment is dropped and each of the other remaining cache segments is moved forward in succession and the pointers are adjusted accordingly. The subprocess continues to step 376 where the process is repeated until all the bytes are sent to the destination system.

Figure 13:
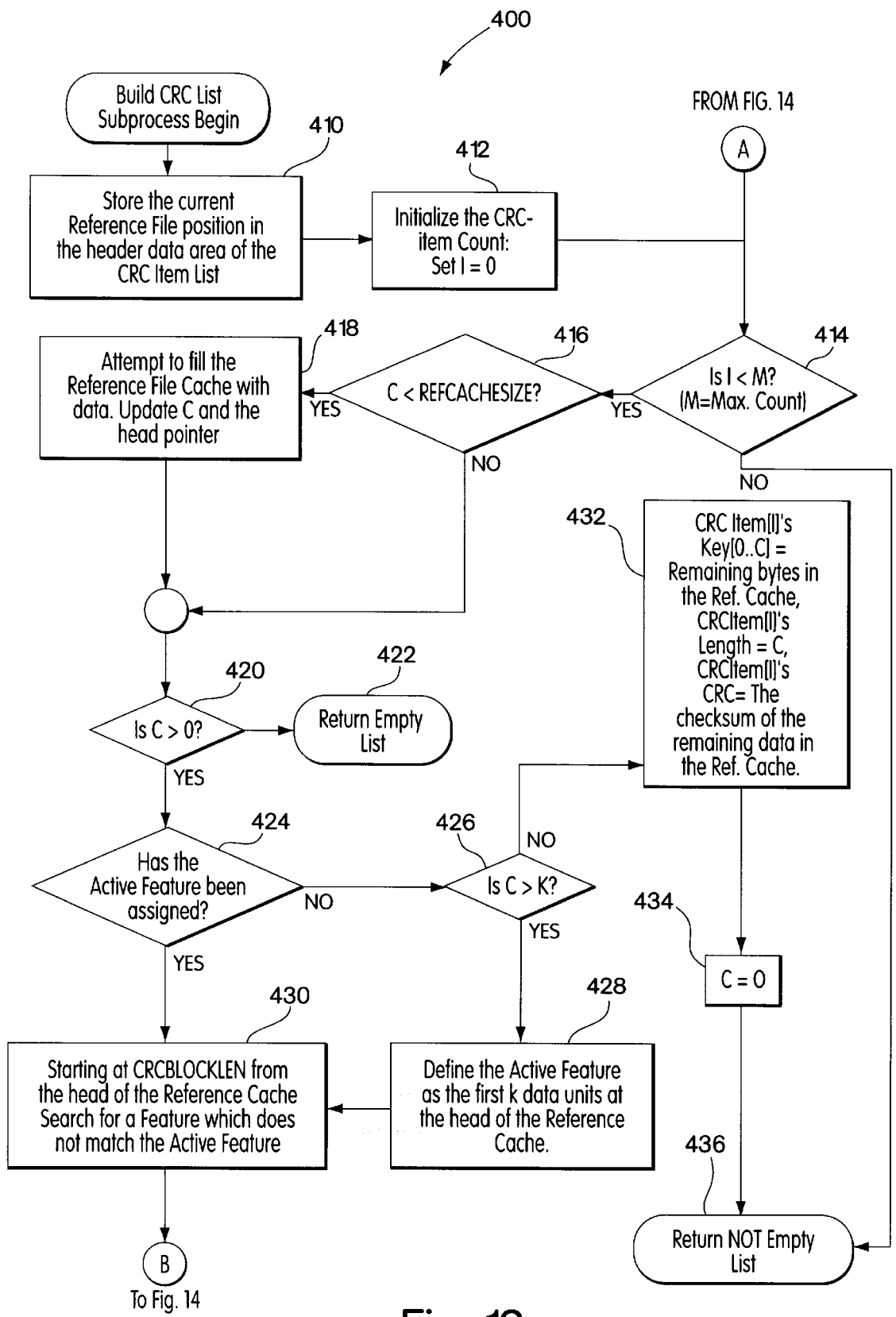
FIGS. 13 and 14 are flowcharts showing the build CRC list subprocess in accordance with an alternative embodiment of the invention.
Figure 14:
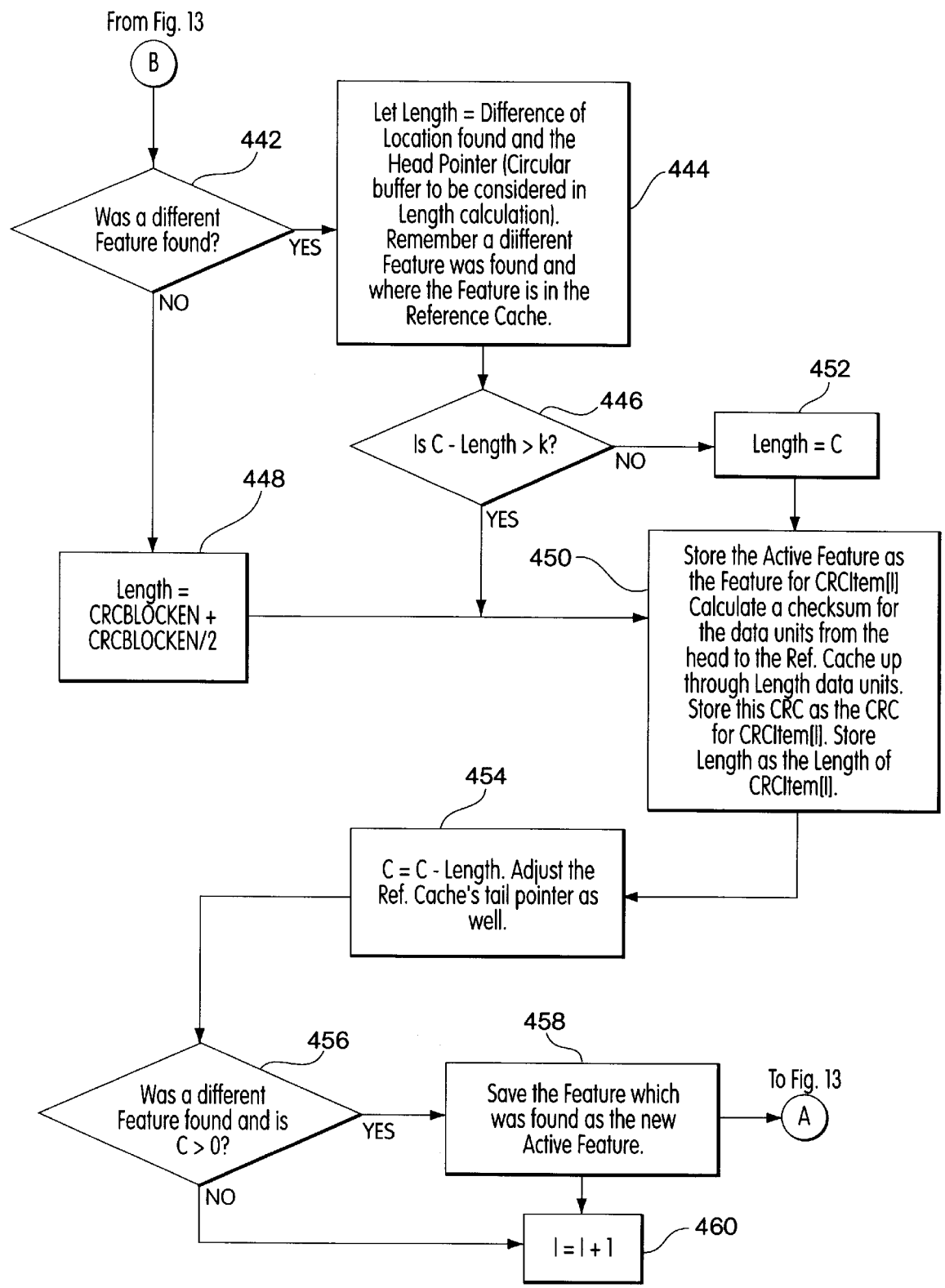

FIGS. 13 and 14 show a modified version of the build CRC list subprocess in accordance with an alternate embodiment of the preferred invention. The build CRC list subprocess 400 differs from the subprocess 240 shown in FIG. 7 in that the Features selected for each successive CRC-item are unique with respect to the Feature of the previous CRC-item. This is accomplished by storing a portion of the reference file in a reference cache (ref. cache). The size of the reference cache is equal to n the nominal length of a reference block plus an additional value. Preferably, the additional value is greater than the length of a Feature. In the preferred embodiment, the additional value is equal to one half the length of a reference block n plus the length of the Feature, k, although this can vary.

In the preferred embodiment, the ref. cache is a first in first out (FIFO) buffer with a head pointer and a tail pointer. The head pointer indicates where the reference block begins in the ref. cache and the tail pointer indicates the end of the ref. cache. In addition, the system determines the difference between the head point and the tail pointer, herein designated C, which indicates the number of data units that have not been processed and not assigned to a CRC-item.

As shown in FIG. 13, the build CRC list subprocess 400 begins at step 410 where the current reference file pointer is stored as the Block Offset of the CRC-block. The subprocess continues at step 412 where the CRC-item count is initialized. At step 414, the subprocess tests whether the CRC-item count is greater than maximum CRC-item count. In the maximum CRC-item count is set to 10 for the first CRC-block generated and 50 for all subsequent CRC-blocks. If the CRC-item count is greater than or equal to the maximum CRC-item count, the subprocess continues to step 436 where the process terminates and returns to the calling process with the CRC-list. If the CRC-item count is less than the maximum CRC-item count, the subprocess continues at step 416 where the number of unprocessed data units in the ref. cache, C is compared to the ref. cache size. If C is less than the ref. cache size, the process continues at step 418 and if C is greater than or equal to the ref. cache size, the process continues at step 420. At step 420, the system tests to determine if C is greater than zero. If C is not greater than zero, the subprocess continues to step 422 where the subprocess terminates and returns to the calling process indicating that the CRC-item list is empty. If C is greater than zero, the process continues to step 424.

At step 418, the ref. cache is filled more data from the reference file. In addition, the head pointer and value of C (the number of data units to be processed) are updated as well.

At step 424, the system tests to determine if an Active Feature had been assigned. The Active Feature is the Feature used to test the uniqueness in the succeeding Feature. If the Active Feature has not been assigned, the subprocess continues at step 426 and if the Active Feature has been assigned, the subprocess continues at step 430.

At step 426, the system tests to determine if the number of data units to be processed is less than the length of a Feature. If the number of data units to be processed is not less than the length of a Feature, the subprocess continues at step 432 and if the number of data units to be processed is less than the length of a Feature, the subprocess continues at step 428.

At step 432, the number of data units to be processed in the ref cache C is less than the number of data units in a Feature. In this case, the remaining C data units are assigned as the Feature, a CRC checksum is generated for the C data units and a CRC-item is generated for source block containing C data units. The subprocess continues to step 434 where C is set to zero and the subprocess continues to step 436 where the subprocess is terminated and a CRC-item list is returned to the calling process.

At step 428, the first k data units from the beginning of the ref. cache are designated as the Active Feature and the subprocess continues at step 430. At step 430, the subprocess begins searching the ref. cache for a Feature which does not match the Active Feature. The search starts at the end the first reference block (i.e. at the beginning of the second reference block) to the end of the ref. cache (as indicated by the end pointer). The subprocess continues at step 442 where, if a different Feature was found, the subprocess continues to step 444 and if a different Feature was not found, the subprocess continues at step 448. At step 448, the length of the reference block is set to be the length of a reference block plus the additional value. The subprocess continues at step 450.

At step 444, the length of reference block, L is set to be the difference between the location where the different Feature was found and head pointer. In addition, a flag is set indicating that a different Feature was found and a pointer is set indicating where the different Feature was found in the ref. cache. The process continues at step 446 where the difference between C and L is compared to k. If C−L is less than k, L is set to be equal to C and the process continues at step 452. If C−L is not less than k, the process continues at step 452.

At step 452, the subprocess sets the Active Feature as the Feature for the current CRC-item, CRC-item(I) being generated, calculates a CRC checksum for the L data units beginning at the head pointer and sets the checksum and length L as the checksum and length for the current CRC-item. The process continues at step 454 where C is set to C−L and the head pointer is adjusted by an amount L into the ref. cache.

At step 456, the system tests whether the different Feature found flag is set to true and C is greater than zero. If a different Feature was found and C>0, the subprocess continues at step 458 where the Feature that was found becomes the Active Feature and the subprocess continues at step 460. If a different Feature was not found or C is less than or equal to zero, the process continues at step 460.

At step 460, the CRC-item counter is incremented and the subprocess continues at step 414 where process is repeated for the next M CRC-items. In the preferred embodiment, M is set to 10 for the first CRC-block generated to expedite the process at the source system and M is set to 50 for each successive CRC-block.

In an alternate embodiment of the invention, the method and apparatus of the invention can be used synchronize blocks of data stored in the memory of two computer systems. For example, computer programs such as Carbon Copy available from Microcom, Inc. Norwood, Mass. and pcANYWHERE available from Symantec Corporation, Cupertino, Calif. allow users to remotely control another computer. This is accomplished by reproducing the screen display of the remote computer at the user's local computer. In accordance with the invention, the invention can be used to synchronize or update the data stored video memory as if the data were a file.

In another embodiment, the method of the invention can be used to perform file copying from one location in memory to another location in memory. For example, copying a file from one location on a local disk drive to a second location on a local disk drive. In this embodiment, both the source and destination processes could be performed on the same system.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

APPENDIX A

```
/*------------------------------------------------*/
/*                SYNC.H                          */
/*                                                */
/*   Header module for Synchronization support in FX.  */
/*                                                */
/*           January 16, 1995                     */
/*           by Paul J. Burkacki                  */
/*                                                */
/*      Copyright (c) Microcom Systems, Inc. 1992 */
/*           All rights reserved.                 */
/*                                                */
/*------------------------------------------------*/

// source cache
#define CACHESEGLEN     32768U
#define CACHESEGS       6
define SYNCBLOCKLEN    1150 if CACHESEGS < 2
error There must be at least two source cache segments!
endif if CACHESEGLEN < DECMP_WORKBUFSIZE
error Cache segment size is too small to be used as a decompression buffer!
endif // CRC cache
define MAXCRCCACHE     5
#define CRCBLOCKLEN     5120
#define KEYLEN          16
#define MAXBLOCKCOUNT   50

// sync block types
#define COPYCRCBLOCK       0
#define WRITEDATABLOCK     1
#define WRITECOMPDATA      2
#define WRITECOMPDATAEND   3
define FREECRCLIST        4 define MAXFILENAMELEN  80 typedef struct tagFILEINFO
{
``` sync.h 1

```
  char    szName[MAXFILENAMELEN];      // File name
  HFILE   hfFile;                      // File handle
  DWORD   dwLen;                       // File size
} FILEINFO, FAR *LPFILEINFO;

typedef struct tagCRCITEM
{
  BYTE    byKey[KEYLEN];               // Block key
  WORD    wLen;                        // Block length
  DWORD   dwCRC;                       // Block CRC
} CRCITEM, FAR *LPCRCITEM;

typedef struct tagCRCINFO
{
  WORD    wID;                         // CRC list ID
  DWORD   dwStartOffset;               // Offset this CRC list
  WORD    wKeyCnt;                     // Number of keys in this list
  CRCITEM crc[MAXBLOCKCOUNT];          // Array of CRC items
} CRCINFO, FAR *LPCRCINFO;

#if sizeof(CRCINFO) > 1190
#error CRC block size is too big!
endif typedef struct tagSYNCINFO
{
  WORD    wID;                         // SYNC block corresponds to CRC list with this id
  WORD    wIndex;                      // Index of key for which a mismatch was found
  WORD    wType;                       // Type of sync block
  WORD    wSize;                       // Size of this SYNC block
  BYTE    byData[SYNCBLOCKLEN];        // SYNC data
} SYNCINFO, FAR *LPSYNCINFO;

#if sizeof(SYNCINFO) > 1190
#error SYNC block size is too big!
endif typedef struct tagFILECACHE
{
  DWORD   dwBlkOff;                    // Destination file position
  WORD    wSegs;                       // number of cache segments in use WORD    wMatchSeg;                   // matching segment
``` sync.h 2

```
    WORD    wMatchOff;              // matching offset
    BOOL    bSync;                  // at least one match was found BOOL    bLastSeg[CACHESEGS];    // is this the last cache segment?
    DWORD   dwOffset[CACHESEGS];    // start of each cache segment
    WORD    wLen[CACHESEGS];        // length of each cache segment
    LPBYTE  lpData[CACHESEGS];      // Cache data
} FILECACHE, FAR *LPFILECACHE;

//
// internal sync functions
//
WORD SyncSend(BYTE Type, LPBYTE lpBuf, WORD wLen);
void SyncAbort(XFRERROR e);
void InitCache(void);
void DropFirstCacheSegment(void);
BOOL BuildCRCList(LPXFRFILECOPY lpFS, LPCRCINFO lpCRC);
void InitRegenBuf(LPFILEINFO lpFI, LPXFRFILECOPY lpFS);
BOOL LocateKey(LPCRCINFO lpCRC, WORD wIndex);
BOOL ProcessSyncBlock(LPSYNCINFO lpSync, LPFILEINFO lpFI);
void GenerateCRCBlocks(void);
void SyncCache(DWORD dwOffset);

void CompressSyncBlock(LPSYNCINFO lpSync);
void DecompressSyncBlock(LPSYNCINFO lpSync);

void SyncWrite(BOOL bFlush, LPBYTE lpBuf, WORD wBytes);

//
// message processing functions
//
void ProcessFXSyncStart(LPFXCMD lpBuf);
void ProcessFXSyncStarted(LPFXCMD lpBuf);
void ProcessFXCRCBlock(LPFXCMD lpBuf);
void ProcessFXSyncBlock(LPFXCMD lpBuf);
void ProcessFXCRCEnd(void);
void ProcessFXSyncEnd(void);
void ProcessFXSyncAbort(XFRERROR e, BOOL bRemote);
void ProcessFXSyncFail(LPFXCMD lpBuf);

sync.h 3
```

```
/*---------------------------------------------------------*/
/*                   SYNC.C                              */
/*                                                       */
/*    Function module for Synchronization support if FX. */
/*                                                       */
/*           January 16, 1995                            */
/*           by Paul J. Burkacki                         */
/*                                                       */
/*        Copyright (c) Microcom Systems, Inc. 1992      */
/*               All rights reserved.                    */
/*                                                       */
/*---------------------------------------------------------*/
define STRICT include <windows.h>
include <windowsx.h>
#include <io.h>
#include <sys\stat.h>
#include <stdio.h>
include <string.h> include "xfrapi.h"
include "ccfxlib.h"
#include "debug.h"
#include "xfrker.h"
#include "xfrkses.h"
#include "sync.h"
#include "crashrec.h"
#include "implode.h"

#if WRITECACHE_SIZE < CMP_WORKBUFSIZE
#error Write cache is too small to use as a compression buffer!!!
endif // calculate size of a sync block for transmission purposes
define  SYNCSIZE(p) (sizeof(SYNCINFO) - SYNCBLOCKLEN + p.wSize)
// calculate size of a CRC block for transimission purposes
#define  CRCSIZE(p) (sizeof(DWORD)+sizeof(WORD)*2+sizeof(CRCITEM)*(p)->wKeyCnt)

extern XFRCOPYSTAT xfcStat;
extern BOOL bNewCopyStats;
extern char *TmpName;
extern XFRCOPYSTAT xfcStat;
``` sync.c 1

```c
extern HWND hwndInit;
extern HWND hwndFXThread;
extern HWND hwndMon;

// Synchronize variables.
extern FILEINFO TmpFile;
extern XFRFILECOPY FS;
extern LPFILEINFO lpTmpFile;
extern LPXFRFILECOPY lpFS;
extern BOOL bSyncDone, bSyncFail;
extern BOOL bSyncMode;
extern BOOL bNewCopyStats;

extern LPSTR lpWriteCache;
extern LPBYTE lpReadBuf;

static DWORD dwBytes;
static char szFilePath[MAXPATHLEN];
BOOL bCompressed = FALSE;
extern BOOL bDiskFull;
extern BOOL bDiskError;

FILECACHE SrcCache;
SYNCINFO SyncInfo;
LPCRCINFO lpCRCCache = NULL, CRCCacheSeg[MAXCRCCACHE];
BOOL bCrashRecovery = FALSE;
BOOL bReceiving;
BOOL bSyncAbort;
BOOL bSentEnd;
HWND hwndSyncStatus = 0;
DWORD dwCurPos;
WORD wCacheSize = 0;
LPBYTE lpCache;
WORD wCompData = 0;
BOOL bReadOnly;

// set DETAILS to 1 to generate detailed info on
// every SYNC & CRC block received
define DETAILS 0 ifdef DEBUG
// dump contents of a CRC block, debug only
#pragma argsused
```

```
void dumpCRC(int n, LPCRCINFO lc)
{
#if DETAILS
    DBG(dprintf("#%d: Offset = %ld, wKeyCnt = %d\n", n, lc->dwStartOffset, lc->wKeyCnt));
#endif
}

// dump contents of a SYNC block, debug only
#pragma argsused
void dumpSync(int n, LPSYNCINFO ls)
{
#if DETAILS
    DBG(dprintf("#%d: id = %d, index = %d, size = %d, type = %d\n",
        n, ls->wID, ls->wIndex, ls->wSize, ls->wType));
#endif
}
endif /*
****************************************************************
*
*   Send message to remote sync
*
****************************************************************
*/
WORD SyncSend(BYTE Type, LPBYTE lpBuf, WORD wLen)
{
    WORD wYield = YIELD_ALL;
    WORD RetCode;

if (Type != FX_NULL)
    {
        RetCode = XFK_SesSend(Type, lpBuf, wLen);
    } if (bNewCopyStats)
    {
        if (hwndSyncStatus != 0)
        {
            SendMessage(hwndSyncStatus, XFR_COPYSTATUS, 0, (LPARAM)(LPXFRCOPYSTAT)&xfcStat);
        }
        bNewCopyStats = FALSE;
    }
``` sync.c 3

```c
    if (RetCode == XFR_OK && CheckAbort(wYield) != XFR_OK)
    {
        SyncAbort(XFR_USERABORT);
    }
    return RetCode;
}

/*******************************************************************
 *
 * abort sync
 *
 * e:   reason for abortion
 *
 *******************************************************************/
void SyncAbort(XFRERROR e)
{
    if (!bSyncAbort)
    {
        bSyncAbort = TRUE;
        SyncSend(FX_SYNCABORT, (LPBYTE) &e, sizeof(e));
    }
}

/*******************************************************************
 *
 * BuildCRCList()
 *
 * Builds a CRC list for the file given by the argument.
 *
 * Parameters    Type           Description
 * ==========    ============   =============================
 * lpFS          LPXFRFILECOPY  Far pointer to XFRFILECOPY structure
 * lpCRC         LPCRCINFO      Far pointer to CRCINFO structure
 *
 * Returns
 * =======
 * TRUE if no more blocks
 *
 *******************************************************************/
BOOL BuildCRCList(LPXFRFILECOPY lpFS, LPCRCINFO lpCRC)
``` sync.c 4

```
{
  WORD i, wBlocks = MAXBLOCKCOUNT;

if (!bSyncAbort && !bSyncDone)
  {
    _fmemset(lpCRC->crc, 0, sizeof(CRCITEM)*MAXBLOCKCOUNT);
    if (dwCurPos == 0)
    {
      wBlocks = MAXBLOCKCOUNT/5;
    }
    // Build as many CRC blocks as possible
    lpCRC->dwStartOffset = _llseek(lpFS->iDestHandle, dwCurPos, SEEK_SET);
    for (i = 0; i < wBlocks; ++i)
    {
      // Read a block of data from the file and calculate the CRC
      lpCRC->crc[i].wLen = _lread(lpFS->iDestHandle, lpReadBuf, CRCBLOCKLEN);
      if (lpCRC->crc[i].wLen == 0)
      {
        break;
      }
      else if (lpCRC->crc[i].wLen == (WORD) HFILE_ERROR)
      {
        bDiskError = TRUE;
        SyncAbort(XFR_DISKERROR);
        SendMessage(hwndInit, XFR_SETLOCALABORT, 0, 0L);
        break;
      }
      _fmemcpy(lpCRC->crc[i].byKey, lpReadBuf, min(KEYLEN, lpCRC->crc[i].wLen));
      lpCRC->crc[i].dwCRC = GetBlockCRC(lpReadBuf, lpCRC->crc[i].wLen);
    }
    lpCRC->wKeyCnt = i;
    dwCurPos = _llseek(lpFS->iDestHandle, 0L, SEEK_CUR);
    return lpCRC->wKeyCnt == 0;
  }
  return TRUE;
}

/*****************************************************************
 *
 * InitRegenBuf()
 *
 * Initializes and creates the reconstruction file.
 * Note that the destination path must have already been copied to FILEINFO
``` sync.c 5

```
 * structure to ensure the creation of the temporary file at the proper
 * location.
 *
 * Parameters     Type         Description
 * ==========     ==========================
 * lpFI           LPFILEINFO   Far pointer to FILEINFO structure
 * lpFS           LPXFRFILECOPY Far pointer to XFRFILECOPY structure
 *
 * Returns
 * =======
 * nothing
 *
 ************************************************************
 */
void InitRegenBuf(LPFILEINFO lpFI, LPXFRFILECOPY lpFS)
{
  lpFI->dwLen = 0;
  if (bCrashRecovery)
  {
    if ((lpFI->hfFile = _lopen(lpFI->szName, READ_WRITE)) != HFILE_ERROR)
    {
      char filename[MAXPATHLEN];
      DWORD LocalCRC, RemoteCRC, dwLen;

dwLen = filelength(lpFI->hfFile);
      LOC_GetFileCRC(lpFI->szName, dwLen, &LocalCRC);
      CreatePath(filename, lpFS->szFromPath, lpFS->szSrcFile);
      REM_GetFileCRC(filename, dwLen, &RemoteCRC);

DBG(dprintf("Crash Recovery: name = %s, length = %ld\n", lpFI->szName, dwLen));
      DBG(dprintf("  Local CRC = %08lX, Remote CRC = %08lX\n", LocalCRC, RemoteCRC));

if (LocalCRC == RemoteCRC)
      {
        int cbRead;
        LPBYTE buffer = GlobalAllocPtr(GHND, 16384);
        _llseek(lpFI->hfFile, 0L, SEEK_SET);
        _llseek(lpFS->iDestHandle, 0L, SEEK_SET);
        // copy the reconstruction file to the new file
        if (buffer != 0)
        {
          while ((cbRead = _lread(lpFI->hfFile, buffer, 16384)) > 0)
          {
``` sync.c 6

```c
                _lwrite(lpFS->iDestHandle, buffer, cbRead);
            }
            (void) GlobalFreePtr(buffer);
        }
    }
    _lclose(lpFI->hfFile);
    _llseek(lpFS->iDestHandle, 0L, SEEK_SET);
        }
    }
    lpFI->hfFile = _lcreat(lpFI->szName, 0);
}

/*
 ******************************************************************
 *
 * Fill cache from source file
 *
 ******************************************************************
 */
void InitCache(void)
{
    int i;

SrcCache.dwBlkOff = 0L;
    SrcCache.wSegs = 0;

_llseek(FS.iSrcHandle, 0L, SEEK_SET);
    for (i = 0; i < CACHESEGS; ++i)
    {
        SrcCache.bLastSeg[i] = FALSE;
        SrcCache.dwOffset[i] = _llseek(FS.iSrcHandle, 0L, SEEK_CUR);
        SrcCache.wLen[i] = _lread(FS.iSrcHandle, SrcCache.lpData[i], CACHESEGLEN);
        if (SrcCache.wLen[i] == 0)
        {
            SrcCache.bLastSeg[i-1] = TRUE;
            break;
        }
        else if (SrcCache.wLen[i] == (WORD) HFILE_ERROR)
        {
            bDiskError = TRUE;
            SyncAbort(XFR_DISKERROR);
            SendMessage(hwndInit, XFR_SETLOCALABORT, 0, 0L);
            break;
```

```
      }
      SrcCache.wSegs++;
      if (SrcCache.wLen[i] < CACHESEGLEN)
      {
         SrcCache.bLastSeg[i] = TRUE;
         break;
      }
      _llseek(FS.iSrcHandle, -CRCBLOCKLEN, SEEK_CUR);
   }
   SrcCache.bSync = FALSE;
}

/*
 ******************************************************************
 *
 * Throw away the first cache segment and update the cache end
 *
 ******************************************************************
 */
void DropFirstCacheSegment(void)
{
   if (SrcCache.wSegs > 0)
   {
      int i;
      LPBYTE lpSave = SrcCache.lpData[0];

for (i = 0; i < CACHESEGS-1; ++i)
      {
         SrcCache.dwOffset[i] = SrcCache.dwOffset[i+1];
         SrcCache.wLen[i] = SrcCache.wLen[i+1];
         SrcCache.lpData[i] = SrcCache.lpData[i+1];
         SrcCache.bLastSeg[i] = SrcCache.bLastSeg[i+1];
      }
      SrcCache.bLastSeg[CACHESEGS-1] = TRUE;
      SrcCache.lpData[CACHESEGS-1] = lpSave;
      SrcCache.wSegs--;
      if (SrcCache.wSegs == CACHESEGS-1 && SrcCache.wLen[SrcCache.wSegs] == CACHESEGLE
          N)
      {
         SrcCache.dwOffset[i] = _llseek(FS.iSrcHandle, 0L, SEEK_CUR);
         SrcCache.wLen[i] = _lread(FS.iSrcHandle, SrcCache.lpData[i], CACHESEGLEN);
         if (SrcCache.wLen[i] == 0)
         {
```

```
      return;
    }
    else if (SrcCache.wLen[i] == (WORD) HFILE_ERROR)
    {
      bDiskError = TRUE;
      SyncAbort(XFR_DISKERROR);
      SendMessage(hwndInit, XFR_SETLOCALABORT, 0, 0L);
    }
    else if (SrcCache.wLen[i] < CACHESEGLEN)
    {
      SrcCache.bLastSeg[CACHESEGS-1] = FALSE;
    }
    SrcCache.wSegs++;
    _llseek(FS.iSrcHandle, -CRCBLOCKLEN, SEEK_CUR);
    }
  }
}

/*
 * ............................................................
 *
 * cached write
 *
 * bFlush:   flush before writing
 * lpBuf:    data to write
 * wBytes:   number of bytes to write
 *
 * ............................................................
 */
void SyncWrite(BOOL bFlush, LPBYTE lpBuf, WORD wBytes)
{
  if ((bFlush && wCacheSize > 0) || wCacheSize > CACHESEGLEN - wBytes)
  {
    if (_lwrite(TmpFile.hfFile, lpCache, wCacheSize) != wCacheSize)
    {
      SyncAbort(XFR_DISKFULL);
    }
    wCacheSize = 0;
  } if (wBytes > 0)
  {
    _fmemcpy(lpCache+wCacheSize, lpBuf, wBytes);
``` sync.c 9

```
      wCacheSize += wBytes;
   }
}

/****************************************************************
 *
 * LocateKey()
 *
 * Locates, within the source file, the CRC block key used for synchronization
 * purposes.
 *
 * Parameters     Type        Description
 * ==========     ====        ===========
 * lpCRC          LPCRCINFO   Far pointer to CRCINFO structure
 * wIndex         WORD        ID of CRC block under consideration
 *
 * Returns
 * =======
 * TRUE  - Found the key.
 * FALSE - Did not find the key.
 *
 ****************************************************************/

BOOL LocateKey(LPCRCINFO lpCRC, WORD wIndex)
{
   register LPBYTE lpCur, lpCacheEnd, lpKey, lpCacheStart;
   WORD wKeyLen = min(KEYLEN, lpCRC->crc[wIndex].wLen), i, wStartOff;

lpKey = lpCRC->crc[wIndex].byKey;
   while (SrcCache.wSegs > 1 && SrcCache.dwBlkOff >= SrcCache.dwOffset[1])
   {
      DropFirstCacheSegment();
   }
   wStartOff = (WORD) (SrcCache.dwBlkOff - SrcCache.dwOffset[0]);
   for (i = 0; i < SrcCache.wSegs; ++i, wStartOff = 0)
   {
      lpCacheEnd = SrcCache.lpData[i] + SrcCache.wLen[i];
      lpCacheStart = SrcCache.lpData[i] + wStartOff;
      lpCur = lpCacheStart;
      while (lpCur < lpCacheEnd - CRCBLOCKLEN)
      {
         if ((lpCur = _fmemchr(lpCur, lpKey[0], (WORD)(lpCacheEnd-lpCur)-CRCBLOCKLEN)) == NUL
```

```
            L)
            {
              break;
            }
            if (lpCur < lpCacheEnd - CRCBLOCKLEN && _fmemcmp(lpCur, lpKey, wKeyLen) == 0)
            {
              if (GetBlockCRC(lpCur, CRCBLOCKLEN) == lpCRC->crc[wIndex].dwCRC)
              {
                SrcCache.wMatchSeg = i;
                SrcCache.wMatchOff = (WORD)(lpCur - SrcCache.lpData[i]);
                return TRUE;
              }
              return FALSE;
            }
            ++lpCur;
        }
    }
    return FALSE;
} static LPBYTE lpInBuf, lpOutBuf;
static WORD wInBytes, wOutBytes;

//
//   PKWare read buffer
//
static unsigned far pascal ReadBuf(char far *buffer, unsigned short far *size)
{
    if (wInBytes > 0)
    {
        WORD wBytes = min(wInBytes, *size);
        _fmemcpy(buffer, lpInBuf, wBytes);
        lpInBuf += wBytes;
        wInBytes -= wBytes;
        return wBytes;
    }
    return 0;
}

//
//   PKWare write buffer
//
static void far pascal WriteBuf(char far *buffer, unsigned short far *size)
``` sync.c 11

```
{
    _fmemcpy(lpOutBuf, buffer, *size);
    wOutBytes += *size;
    lpOutBuf += *size;
}

//
// PKWare write buffer to write cache
//
static void far pascal ExpWriteBuf(char far *buffer, unsigned short far *size)
{
    SyncWrite(FALSE, (LPBYTE) buffer, *size);
}

/****************************************************************
 *
 * ProcessSyncBlock()
 *
 * Processes the source file SYNC block.
 *
 * Parameters    Type         Description
 * ==========    ==========   ===========================
 * lpSync        LPSYNCINFO   Far pointer to SYNCINFO structure
 * lpFI          LPFILEINFO   Far pointer to FILEINFO structure
 *
 * Returns
 * =======
 * TRUE  - Was able to write all pending CRC blocks and the SYNC block.
 * FALSE - Failed to perform a write on one of the blocks.
 *
 ****************************************************************/
BOOL ProcessSyncBlock(LPSYNCINFO lpSync, LPFILEINFO lpFI)
{
    LPCRCINFO lpCRC;
    WORD wLen;

switch (lpSync->wType)
    {
      case COPYCRCBLOCK :
        lpCRC = CRCCacheSeg[lpSync->wID];
        wLen = lpCRC->crc[lpSync->wIndex].wLen;
        DBG(dprintf("COPYCRCBLOCK: id=%d, index=%d, len=%u\n", lpSync->wID, lpSync->wIndex
``` sync.c 12

```
      , wLen));
   _lseek(FS.iDestHandle, lpCRC->dwStartOffset + (DWORD)lpSync->wIndex * CRCBLOCKLEN,
      SEEK_SET);
   if (_lread(FS.iDestHandle, lpReadBuf, wLen) == (WORD) HFILE_ERROR)
   {
      bDiskError = TRUE;
      SyncAbort(XFR_DISKERROR);
      SendMessage(hwndInit, XFR_SETLOCALABORT, 0, 0L);
   }
   else
   {
      SyncWrite(FALSE, lpReadBuf, wLen);
   }
   break;

case WRITEDATABLOCK :
   DBG(dprintf("WRITEDATABLOCK: size=%u\n", lpSync->wSize));
   SyncWrite(FALSE, lpSync->byData, lpSync->wSize);
   break;

case WRITECOMPDATA :
   DBG(dprintf("WRITECOMPDATA: size=%u\n", lpSync->wSize));
   _fmemcpy(lpWriteCache+wCompData, lpSync->byData, lpSync->wSize);
   wCompData += lpSync->wSize;
   break;

case WRITECOMPDATAEND :
   DBG(dprintf("WRITECOMPDATAEND: size=%u\n", lpSync->wSize));
   _fmemcpy(lpWriteCache+wCompData, lpSync->byData, lpSync->wSize);
   wCompData += lpSync->wSize;
   lpInBuf = (LPBYTE) lpWriteCache;
   wInBytes = wCompData;
   explode(ReadBuf, ExpWriteBuf, (char far *) SrcCache.lpData[1]);
   wCompData = 0;
   break;

case FREECRCLIST :
   DBG(dprintf("FREECRCLIST: id=%d\n", lpSync->wID));
   CRCCacheSeg[lpSync->wID] = NULL;
   GenerateCRCBlocks();
   break;
}
``` sync.c 13

```
    xfcStat.dwBytesSent = filelength(lpFI->hfFile);
    bNewCopyStats = TRUE;
    return TRUE;
}

/*
 ********************************************************************
 * Function:   GenerateCRCBlocks
 * Desc:       creates and sends CRC blocks to remote machine
 *
 ********************************************************************
 */
void GenerateCRCBlocks(void)
{
    int i;

if (bSyncAbort || bSyncDone)
    {
        return;
    } if (bSyncMode)
    {
        DBG(dprintf("Generating CRC blocks\n"));
        for (i = 0; !bSyncAbort && i < MAXCRCCACHE; ++i)
        {
            if (CRCCacheSeg[i] == NULL)
            {
                LPCRCINFO lpCRC = &lpCRCCache[i];

CRCCacheSeg[i] = lpCRC;
                lpCRC->wID = i;                    // ID of this CRC block
                if (BuildCRCList(lpFS, lpCRC))     // Fill in the CRC list
                {
                    if (!bSyncAbort)
                    {
                        SyncSend(FX_CRCEND, NULL, 0);
                    }
                    bSyncMode = FALSE;
                    return;
                }

DBG(dumpCRC(1, lpCRC));
```

```
          if (!bSyncAbort && SyncSend(FX_CRCBLOCK, (LPBYTE) lpCRC, CRCSIZE(lpCRC)) != XFR_O
            K)
          {
            bSyncMode = FALSE;
            return;
          }
        }
      }
    }
  }
}
///////////////////////////////////////////////////////////////////////////////
        ///
// Sync message processing routines
///////////////////////////////////////////////////////////////////////////////
        ///

/*
***********************************************************************
* Function:   PrepareToSendFile
* Desc:      Set up to send file using smart copy algorithm
*
* Parameters:
*           bSyncStarted   should we send a FX_SYNCSTARTED message?
*
***********************************************************************
*/
static void PrepareToSendFile(BOOL bSendSyncStarted)
{
  dwBytes = 0L;
  bReceiving = FALSE;
  bSyncAbort = FALSE;
  bSyncDone = FALSE;

DBG(dprintf("Preparing to send file: %s\n", lpFS->szSrcFile));
  CreatePath(szFilePath, lpFS->szFromPath, lpFS->szSrcFile);
  bCompressed = (lpFS->fFlags & CPY_COMPRESS) == CPY_COMPRESS;
  if ((lpFS->iSrcHandle = open_file(szFilePath, OF_READONLY | SH_DENYWRITE)) >= 0)
  {
    lpFS->File.Size = filelength((HFILE) lpFS->iSrcHandle);
    if (bSendSyncStarted)
    {
``` sync.c 15

```c
        WORD wLen = PackFC(lpFS, lpReadBuf);
        SyncSend(FX_SYNCSTARTED, lpReadBuf, wLen);
     }
     bSyncMode = FALSE;              // We are under way
  }
  else
  {
     if (bSendSyncStarted)
     {
        WORD wLen = PackFC(lpFS, lpReadBuf);
        SyncSend(FX_SYNCFAIL, lpReadBuf, wLen);
        SendMessage(hwndInit, XFR_REMOTE_COPY_END, 0, 0L);
     }
     bSyncFail = bSyncAbort = bSyncDone = TRUE;
     return;
  }

InitCache();
  InitCopyStats(&xfcStat);
}

/*
 *..................................................................
 * Function:    preparetoReceiveFile
 * Desc:        Set up to receive file using smart copy algorithm
 *
 * Parameters:
 *          bSyncStarted    should we send a FX_SYNCSTARTED message?
 *
 *..................................................................
 */
static void PrepareToReceiveFile(BOOL bSendSyncStarted)
{
   int i;

lpTmpFile = (LPFILEINFO) &TmpFile;
   _fmemset(lpTmpFile, 0, sizeof(FILEINFO));

// since we are receiveing the file, we can use the
   // first segment of the source cache as a write cache
   wCacheSize = wCompData = 0;
   lpCache = SrcCache.lpData[0];
``` sync.c 16

```
DBG(dprintf("Preparing to receive file: %s\n", lpFS->szDestFile));
CreatePath(szFilePath, lpFS->szToPath, lpFS->szDestFile);
CreatePath(lpTmpFile->szName, lpFS->szToPath, TmpName);
bCrashRecovery = FALSE;
if ((lpFS->fFlags & CPY_CRASHRECOVERY) != 0)
{
   bCrashRecovery = QueryCrashRecovery(lpFS->szToPath, lpFS->szDestFile, lpTmpFile->szName)
   ;
}
bReceiving = TRUE;
bSyncAbort = FALSE;
bSyncDone = FALSE;
dwCurPos = 0L;

bReadOnly = access(szFilePath, 2) != 0;
if (bReadOnly)
{
   if (!IsFlagSet(lpFS->fFlags,CPY_OVERWRITERO))
   {
      if (bSendSyncStarted)
      {
         WORD wLen = PackFC(lpFS, lpReadBuf);
         SyncSend(FX_SYNCFAIL, lpReadBuf, wLen);
         SendMessage(hwndInit, XFR_REMOTE_COPY_END, 0, 0L);
      }
      bSyncFail = bSyncAbort = bSyncDone = TRUE;
      return;
   }
} if ((lpFS->iDestHandle = open_file(szFilePath, OF_READONLY | SH_DENYWRITE)) >= 0)
{
   lpFS->dwDestSize = filelength((HFILE) lpFS->iDestHandle);
   if (bSendSyncStarted)
   {
      WORD wLen = PackFC(lpFS, lpReadBuf);
      SyncSend(FX_SYNCSTARTED, lpReadBuf, wLen);
   }
   InitRegenBuf(lpTmpFile, lpFS);        // Open the reconstruction file
   bSyncMode = TRUE;                     // We are under way
   if ((lpFS->fFlags & CPY_CRASHRECOVERY) != 0)
   {
      CreateCrashRecoveryFile(lpFS->szToPath, lpFS->szDestFile);
```

```c
    }
  }
  else
  {
    if (bSendSyncStarted)
    {
      WORD wLen = PackFC(lpFS, lpReadBuf);
      SyncSend(FX_SYNCFAIL, lpReadBuf, wLen);
      SendMessage(hwndInit, XFR_REMOTE_COPY_END, 0, 0L);
    }
    bSyncFail = bSyncAbort = bSyncDone = TRUE;
  }
  // initialize CRC cache
  _fmemset(lpCRCCache, 0, MAXCRCCACHE*sizeof(CRCINFO));
  for (i = 0; i < MAXCRCCACHE; ++i)
  {
    CRCCacheSeg[i] = NULL;
  }
  GenerateCRCBlocks();
}

BOOL bRemoteSync;

//
// handle a FX_SYNCSTART message
//
void ProcessFXSyncStart(LPFXCMD lpBuf)
{
  lpFS = &FS;
  UnpackFC(lpBuf->Value, lpFS);
  lpFS->fFlags |= CPY_REMOTEREQUEST;
  SendMessage(hwndInit, XFR_REMOTE_COPY_START, XFR_OK, (LPARAM) lpFS);
  bRemoteSync = TRUE;
  bSentEnd = FALSE;

if (lpFS->FromLocale == 'L')
  {
    PrepareToReceiveFile(TRUE);
  }
  else
  {
    PrepareToSendFile(TRUE);
  }
``` sync.c 18

```c
}
//
// handle a FX_SYNCSTARTED message
//
void ProcessFXSyncStarted(LPFXCMD lpBuf)
{
   lpFS = &FS;
   UnpackFC(lpBuf->Value, lpFS);
   bRemoteSync = FALSE;
   bSentEnd = FALSE;

if (lpFS->FromLocale == 'L')
   {
      PrepareToSendFile(FALSE);
   }
   else
   {
      PrepareToReceiveFile(FALSE);
   }
}

//
// handle FX_SYNCFAIL messages
//
void ProcessFXSyncFail(LPFXCMD lpBuf)
{
   lpFS = &FS;
   UnpackFC(lpBuf->Value, lpFS);
   bSyncDone = bSyncFail = bSyncAbort = TRUE;
   if (bRemoteSync)
   {
      SendMessage(hwndInit, XFR_REMOTE_COPY_END, 0, 0L);
   } if (bReceiving)
   {
      close_file(lpFS->iDestHandle);
      close_file(lpTmpFile->hfFile);
      LOC_DeleteFile(lpTmpFile->szName, 1);
      DeleteCrashRecoveryFile();
   }
``` sync.c 19

```c
    else
    {
       close_file(lpFS->iSrcHandle);
    }
}

/*
**********************************************************************
*
*   Send a block of uncompressed data
*
*   lpData:  data block to send
*   wBytes:  size of data block
*
**********************************************************************
*/
void SendData(LPBYTE lpData, WORD wBytes)
{
   DBG(dprintf("SendData(%u)\n", wBytes));
   while (wBytes > 0)
   {
      // fill sync block
      SyncInfo.wID = 0;
      SyncInfo.wIndex = 0;
      SyncInfo.wType = WRITEDATABLOCK;
      SyncInfo.wSize = min(SYNCBLOCKLEN, wBytes);

// update cache info & stats
      xfcStat.dwBytesSent = SrcCache.dwBlkOff += SyncInfo.wSize;
      bNewCopyStats = TRUE;

// send sync block
      if (!bSyncAbort)
      {
         _fmemcpy(SyncInfo.byData, lpData, SyncInfo.wSize);
         DBG(dumpSync(2, &SyncInfo));
         SyncSend(FX_SYNCBLOCK, (LPBYTE) &SyncInfo, SYNCSIZE(SyncInfo));
      }

// update our counters
      wBytes -= SyncInfo.wSize;
      lpData += SyncInfo.wSize;
   }
``` sync.c 20

}
/*
*********************************************************************
*
* Send a block of compressed data
*
* lpData: data block to send
* wBytes: size of data block
*
*********************************************************************
*/
void SendCompressedData(LPBYTE lpData, WORD wBytes)
{
    WORD type = CMP_BINARY, dsize = 4096, cBlocks, i;

DBG(dprintf("SendCompressedData(%u)\n", wBytes));
    if (wBytes <= SYNCBLOCKLEN)
        SendData(lpData, wBytes);
    else
    {
        // compress block into lpReadBuf
        lpInBuf = lpData;
        wInBytes = wBytes;
        lpOutBuf = lpReadBuf;
        wOutBytes = 0;
        implode(ReadBuf, WriteBuf, lpWriteCache, &type, &dsize);
        // break up lpReadBuf and send multiple compressed sync blocks
        cBlocks = (wOutBytes + SYNCBLOCKLEN - 1) / SYNCBLOCKLEN;
        SyncInfo.wID = SyncInfo.wIndex = 0;
        SyncInfo.wType = WRITECOMPDATA;
        lpOutBuf = lpReadBuf;
        for (i = 0; i < cBlocks; ++i)
        {
            WORD wSyncBytes = min(SYNCBLOCKLEN, wOutBytes);

if (i == cBlocks-1)
            {
                SyncInfo.wType = WRITECOMPDATAEND;
                xfcStat.dwBytesSent = SrcCache.dwBlkOff += wBytes;
                bNewCopyStats = TRUE;
            }
            if (!bSyncAbort)

sync.c 21

```
      {
         _fmemcpy(SyncInfo.byData, lpOutBuf, SyncInfo.wSize = wSyncBytes);
         SyncSend(FX_SYNCBLOCK, (LPBYTE) &SyncInfo, SYNCSIZE(SyncInfo));
         lpOutBuf += wSyncBytes;
      }
      wOutBytes -= wSyncBytes;
    }
  }
}

/*
*****************************************************************
*
*   Synchonize cache by sending all data up to a given offset
*
*   dwOffset:   sync point
*   wIndex:     CRC index
*
*****************************************************************
*/
void SyncCache(DWORD dwOffset)
{
  DWORD dwByteCount, dwStartOffset;

// figure out which bytes to send
  if (dwOffset > SrcCache.dwBlkOff)
  {
    dwByteCount = dwOffset - SrcCache.dwBlkOff;
    dwStartOffset = dwOffset - dwByteCount;
    DBG(dprintf("SyncCache: dwOffset=%ld, dwByteCount=%ld\n", dwOffset, dwByteCount));
    while (dwByteCount > 0)
    {
      DWORD dwSegEnd = SrcCache.dwOffset[0] + SrcCache.wLen[0];

if (SrcCache.wLen[0] == CACHESEGLEN)
      {
        dwSegEnd -= CRCBLOCKLEN;
      }

// see if this segment has any of the bytes we need to send
      if (dwStartOffset >= SrcCache.dwOffset[0] && dwStartOffset < dwSegEnd)
      {
        WORD wOffset, wBytes;
```

```c
            wOffset = (WORD)(dwStartOffset - SrcCache.dwOffset[0]);
            wBytes = (WORD)(dwSegEnd - SrcCache.dwOffset[0]) - wOffset;
            if (dwByteCount < wBytes)
            {
                wBytes = (WORD) dwByteCount;
            }
            DBG(dprintf("SyncCache: Sending %u bytes from first cache segment\n", wBytes));
            // send all the appropriate bytes in this segment
            if (bSyncAbort)
            {
                return;
            }
            if (bCompressed)
            {
                SendCompressedData(SrcCache.lpData[0] + wOffset, wBytes);
            }
            else
            {
                SendData(SrcCache.lpData[0] + wOffset, wBytes);
            }
            dwByteCount -= wBytes;
            dwStartOffset += wBytes;
        }
        // if there are bytes left to send, move on to the next cache segment
        DBG(dprintf("%ld bytes left to send\n", dwByteCount));
        if (dwByteCount != 0)
        {
            DropFirstCacheSegment();
            if (SrcCache.wSegs == 0)
            {
                return;
            }
        }
    }
}

//
// handle a FX_CRCBLOCK message
//
void ProcessFXCRCBlock(LPFXCMD lpBuf)
{
```

```c
int i;
LPCRCINFO lpCRC;

if (bSyncAbort || bSyncDone)
{
   return;
} lpCRC = (LPCRCINFO) lpBuf->Value;
DBG(dumpCRC(2, lpCRC));

for (i = 0; i < lpCRC->wKeyCnt; ++i)
{
   if (SrcCache.wSegs > 0)
   {
      if (LocateKey(lpCRC, i))
      {
         DBG(dprintf("Found key: wSeg=%u, wOff=%u\n", SrcCache.wMatchSeg, SrcCache.wMatc
            hOff));
         SyncCache(SrcCache.dwOffset[SrcCache.wMatchSeg] + SrcCache.wMatchOff);
         if (!bSyncAbort)
         {
            SyncInfo.wID = lpCRC->wID;
            SyncInfo.wIndex = i;
            SyncInfo.wType = COPYCRCBLOCK;
            SyncInfo.wSize = 0;

DBG(dumpSync(3, &SyncInfo));
            xfcStat.dwBytesSent = SrcCache.dwBlkOff += lpCRC->crc[i].wLen;
            bNewCopyStats = TRUE;
            SyncSend(FX_SYNCBLOCK, (LPBYTE) &SyncInfo, SYNCSIZE(SyncInfo));
         }
         SrcCache.bSync = TRUE;
      }
      else if (!SrcCache.bSync && !bSyncAbort)
      {
         SyncCache(min(SrcCache.dwBlkOff+SYNCBLOCKLEN, FS.File.Size));
      }
   }
}
if (!bSyncAbort)
{
   SyncInfo.wType = FREECRCLIST;
``` sync.c 24

```c
        SyncInfo.wID = lpCRC->wID;
        SyncInfo.wSize = SyncInfo.wIndex = 0;
        SyncSend(FX_SYNCBLOCK, (LPBYTE) &SyncInfo, SYNCSIZE(SyncInfo));
    }
}

//
// handle a FX_SYNCBLOCK message
//
void ProcessFXSyncBlock(LPFXCMD lpBuf)
{
    LPSYNCINFO lpSync;

if (bSyncAbort || bSyncDone)
    {
        return;
    } lpSync = (LPSYNCINFO) &lpBuf->Value;
    ProcessSyncBlock(lpSync, lpTmpFile);
    SyncSend(FX_NULL, NULL, 0);
}

//
// handle a FX_CRCEND message
//
void ProcessFXCRCEnd(void)
{
    // we got an 'end of old file' indication
    // just send the rest of the new file (if any)
    // and let the other side know that we're finished
    SyncCache(FS.File.Size);
    if (!bSyncAbort)
    {
        SyncSend(FX_SYNCEND, NULL, 0);
    }
    bSyncDone = TRUE;
    close_file(lpFS->iSrcHandle);
    if (bRemoteSync)
    {
        SendMessage(hwndInit, XFR_REMOTE_COPY_END, 0, 0L);
    }
}
```

```c
//
// handle a FX_SYNCEND message
//
void ProcessFXSyncEnd(void)
{
  if (bRemoteSync)
  {
    SendMessage(hwndInit, XFR_REMOTE_COPY_END, 0, 0L);
  }
  SyncWrite(TRUE, NULL, 0);
  bSyncDone = TRUE;
  DeleteCrashRecoveryFile();
  close_file(FS.iDestHandle);
  close_set(TmpFile.hfFile, FS.File.Time, FS.File.Date);
  if (!bSyncAbort)
  {
#ifdef DEMO
    LOC_DeleteFile((LPSTR) TmpFile.szName, 0);
#else
    setfileattrib(szFilePath, 0);
    LOC_DeleteFile((LPSTR) szFilePath, 0);
    DBG(dprintf("rename(%s,%s)\n", TmpFile.szName, (LPSTR) szFilePath));
    rename(TmpFile.szName, szFilePath);
    setfileattrib(szFilePath, FS.File.FileAttrib);
#endif
  }
}

//
// handle FX_SYNCABORT/FX_SYNCABORTED messages
//
void ProcessFXSyncAbort(XFRERROR e, BOOL bRemote)
{
  bSyncAbort = TRUE;
  if (e == XFR_DISKFULL)
  {
    bDiskFull = TRUE;
  }
  if (bRemoteSync)
  {
    SendMessage(hwndInit, XFR_REMOTE_COPY_END, 0, 0L);
  }
``` sync.c 26

```
if (bRemote)
{
   SyncSend(FX_SYNCABORTED, NULL, 0);
   SendMessage(hwndInit, XFR_SETREMOTEABORT, 0, 0L);
}
if (!bSyncDone)
{
   if (bReceiving)
   {
      close_file(lpFS->iDestHandle);
      close_set(lpTmpFile->hfFile, lpFS->File.Time, lpFS->File.Date);
      LOC_DeleteFile(lpTmpFile->szName, 1);
      DeleteCrashRecoveryFile();
   }
   else
   {
      close_file(lpFS->iSrcHandle);
   }
}
bSyncDone = TRUE;
bSyncMode = FALSE;
}
``` sync.c 27

What is claimed is:

1. A method of transmitting data from a source file located at a first memory location of a data processing system to a destination memory location, said data processing system including a reference file located at a second memory location of said data processing system so that the transmitted data updates the reference file such that the reference and source files are synchronized, the method comprising the steps of:

(A) dividing said reference file into a plurality of reference data blocks, each data block including a plurality of data units;

(B) for each reference data block, determining a corresponding one or more reference items as a function of the data units of said reference data block, wherein each reference item is comprised of original reference file data;

(C) comparing a first portion containing original reference file data of said reference item to a portion of said source file data;

(D) if said first portion of said reference item matches said portion of said source file, determining a source block checksum as function of a source block of data units from said source file which includes the matching portion of said source file, said source block having the same number of data units as said reference data block corresponding to said reference item; and (E) if said source block checksum matches a second portion of said reference item, copying said reference block into said destination memory location.

2. The method according to claim 1 wherein
said step of determining said reference item includes determining the reference item as a function of a reference item feature including one or more data units from the corresponding reference block, a reference block length value and a unique reference block checksum value.

3. The method according to claim 2 wherein
said step of determining said reference item includes determining the reference item feature as a function of a reference item feature from a different reference block.

4. The method according to claim 1 wherein
said step of determining said reference item includes determining the reference item as a function of a reference item feature including one or more data units from the corresponding reference block and said reference item feature is different from at least one other reference item feature associated with a different reference data block.

5. The method according to claim 1 further comprising the step of:

(F) if said source block checksum matches a second portion of said reference item, copying a portion of source file located before said source block in said source file into said destination memory location.

6. An apparatus, including at least one system processor and associated memory, for transmitting data from a source file located at a first memory location to a destination memory location, and including a reference file located at a second memory location so that the transfer of data updates the reference file such that the reference and source files are synchronized, said apparatus comprising:

means for dividing said reference file into a plurality of reference data blocks, each data block including a plurality data units;

means for determining a corresponding one or more reference items for each reference data block as a function of the data units of said reference data block, wherein each reference item is comprised of original reference file data;

means for comparing a first portion containing original reference file data of said reference item to a portion of said source file data;

means for determining a source block checksum as function of a source block of data units in said source file which includes the matching portion of said source file, said source block having the same number of data units as said reference data block corresponding to said reference item, if said first portion of said reference item matches said portion of said source file; and means for copying said reference block into said destination memory location, if said source block checksum matches a second portion of said reference item.

7. The apparatus according to claim 6 further comprising
means for determining said reference item as a function of a reference item feature including one or more data units from the corresponding reference block, a reference block length value and a unique reference block checksum value.

8. The apparatus according to claim 7 further comprising
means for determining the reference item feature as a function of a reference item feature from a reference item feature corresponding to a different reference block.

9. The apparatus according to claim 6 wherein
said means of determining said reference item includes means for determining the reference item as a function of a reference item feature including one or more data units from the corresponding reference block and means for comparing said reference item feature to at least one other reference item feature associated with a different reference data block.

10. The apparatus according to claim 6 further comprising:

means for copying a portion of source file located before said source block in said source file into said destination memory location, if said source block checksum matches a second portion of said reference item.

11. A system, including at least one system processor and associated memory, for transmitting data from a source file located at a first memory location of said system to a destination memory location so that the transfer of data updates the reference file such that the reference and source files are synchronized, said system further including a reference file located at a second memory location, said system comprising:

a processing subsystem adapted for dividing said reference file into a plurality of reference data blocks, each data block including a plurality data units;

a processing subsystem adapted for determining a corresponding one or more reference items for each reference data block as a function of the data units of said reference data block, wherein each reference item is comprised of original reference file data;

a processing subsystem adapted for comparing a first portion containing original reference file data of said reference item to a portion of said source file to determine a matching portion of the source file data;

a processing subsystem adapted for determining a source block checksum as function of a source block of data units in said source file which includes the matching portion of said source file, said source block having the same number of data units as said reference data block corresponding to said reference item, if said first portion of said reference item matches said portion of said source file; and a processing subsystem adapted for copying said reference block into said destination memory location, if said source block checksum matches a second portion of said reference item.

12. The system according to claim 11 further comprising a processing subsystem adapted for determining said reference item as a function of a reference item feature including one or more data units from the corresponding reference block, a reference block length value and a unique reference block checksum value.

13. The apparatus according to claim 12 further comprising a processing subsystem adapted for determining said reference item feature as a function of a reference item feature from a reference item feature corresponding to a different reference block.

14. The apparatus according to claim 11 wherein said processing subsystem adapted for determining said corresponding reference item includes a processing subsystem adapted for determining the reference item as a function of a reference item feature including one or more data units from the corresponding reference block and a processing subsystem adapted for comparing said reference item feature to at least one other reference item feature associated with a different reference data block.

15. The apparatus according to claim 11 further comprising:

a processing subsystem adapted for copying a portion of source file located before said source block in said source file into said destination memory location, if said source block checksum matches a second portion of said reference item.

16. A system, having a system processor and associated memory, for transmitting data from a source file located at a first memory location of said system to a destination memory location located at a remote system, said remote system further including a reference file located at a memory location at said remote system so that the transfer of data updates the reference file such that the reference and source files are synchronized, said system comprising:

a processing subsystem adapted for receiving at least one reference item corresponding to a reference data block, wherein the reference item contains at least one data unit from said reference file;

a processing subsystem adapted for comparing a first portion containing original reference file data of said reference item to a portion of said source file data to determine a matching portion of the source file;

a processing subsystem adapted for determining a source block checksum as function of a source block of data units in said source file which includes the matching portion of said source file, said source block having the same number of data units as said reference data block corresponding to said reference item, if said first portion of said reference item matches said portion of said source file; and a processing subsystem adapted for transmitting a signal to said remote system indicating that the reference data block matches said source block, if said source block checksum matches a second portion of said reference item.

17. The system according to claim 16 further comprising:

a processing subsystem adapted for transmitting to said remote system, a portion of said source file located before said source block in said source file into said destination memory location, if said source block checksum matches a second portion of said reference item.

18. A system, having a system processor and associated memory, for receiving data from a source file located at a first memory location at a remote system, said system further including a reference file located at a second memory location so that the transfer of data updates the reference file such that the reference and source files are synchronized, said system comprising:

a processing subsystem adapted for dividing said reference file into a plurality of reference data blocks, each data block including a plurality data units;

a processing subsystem adapted for determining a corresponding one or more reference items for each reference data block as a function of the data units of said reference data block;

a processing subsystem adapted for transmitting at least one reference item corresponding to a reference data block, wherein each reference item is comprised of original reference item data;

a processing subsystem adapted for receiving a signal from said remote system indicating that a first portion containing original reference item data of said reference item matched a portion of said source file data and a second portion of said reference item matched a source block checksum corresponding to a source block of data units in said source file which includes the matched portion of the source file and the same number of data units as the reference data block; and a processing subsystem adapted for copying said reference block to a destination memory location at said system as a function of said signal.

19. The system according to claim 18 further comprising a processing subsystem adapted for determining said reference item as a function of a reference item feature including one or more data units from the corresponding reference block, a reference block length value and a unique reference block checksum value.

20. The system according to claim 19 further comprising a processing subsystem adapted for determining said reference item feature as a function of a reference item feature from a reference item feature corresponding to a different reference block.

21. The system according to claim 18 wherein said processing subsystem adapted for determining said corresponding reference item includes a processing subsystem adapted for determining the reference item as a function of a reference item feature including one or more data units from the corresponding reference block and a processing subsystem adapted for comparing said reference item feature to at least one other reference item feature associated with a different reference data block.

* * * * *